United States Patent

Takahashi et al.

[11] Patent Number: 5,879,611
[45] Date of Patent: Mar. 9, 1999

[54] STEERING WHEEL MOLD AND METHOD OF MOLDING

[75] Inventors: Katsumi Takahashi; Kimihiro Iimura, both of Gifu, Japan

[73] Assignee: Toyoda Gosei Co., Ltd., Nishikasugai-Gun, Japan

[21] Appl. No.: 947,385

[22] Filed: Oct. 8, 1997

[30] Foreign Application Priority Data

Oct. 11, 1996 [JP] Japan .................................. 8-269987

[51] Int. Cl.⁶ .................................................. B29C 45/44
[52] U.S. Cl. ......................... 264/275; 264/279; 264/318; 264/328.1; 264/334; 425/129.1; 425/556; 425/438; 425/DIG. 58
[58] Field of Search ............................... 264/328.1, 318, 264/275, 279, 273, 274, 271.1, 334; 425/438, 441, 442, DIG. 58, 556, 577, 125, 129.1; 280/728.1, 728.2, 728.3, 731

[56] References Cited

U.S. PATENT DOCUMENTS

| | | | |
|---|---|---|---|
| 3,152,365 | 10/1964 | Fisher | 425/DIG. 58 |
| 3,865,529 | 2/1975 | Guzzo | 425/DIG. 58 |
| 4,101,256 | 7/1978 | White et al. | 425/DIG. 58 |
| 4,634,565 | 1/1987 | Irrgang | 264/276 |
| 4,811,472 | 3/1989 | Kobayashi | 264/276 |
| 5,137,442 | 8/1992 | Starkey | 425/438 |
| 5,204,043 | 4/1993 | Abiko et al. | 264/328.12 |
| 5,281,127 | 1/1994 | Ramsey | 425/DIG. 58 |
| 5,427,408 | 6/1995 | Ando et al. | 264/275 |
| 5,445,048 | 8/1995 | Kaufer et al. | 264/275 |
| 5,501,829 | 3/1996 | Nichols | 264/275 |
| 5,520,971 | 5/1996 | Naritomi | 280/728.1 |
| 5,551,864 | 9/1996 | Boskovic | 425/438 |
| 5,560,264 | 10/1996 | Xolin et al. | 280/731 |
| 5,603,968 | 2/1997 | Tajiri et al. | 425/438 |
| 5,636,859 | 6/1997 | Williams et al. | 280/728.2 |
| 5,692,770 | 12/1997 | Scharboneau et al. | 280/731 |
| 5,741,025 | 4/1998 | Meyer et al. | 280/731 |

*Primary Examiner*—Jill L. Heitbrink
*Attorney, Agent, or Firm*—Pillsbury Madison & Sutro LLP

[57] ABSTRACT

A mold for integrally molding a cover and a pad on a steering wheel. The mold includes a first mold and a second mold relatively movable to the first mold. The first and second molds are separated from each other to place a metal core between the first and second molds. The first and second molds are then joined with each other to define a first cavity for molding the cover. Afterwards, the first and second molds are separated from each other to remove the metal core and the cover. A float core is located between the first and second molds. The float core cooperates with the first and second molds to define a second cavity for integrally molding the pad with the cover when the first and second molds are joined with each other. A pivoting mechanism pivots the float core to remove the steering wheel from the molds.

33 Claims, 24 Drawing Sheets

STEERING WHEEL MOLD AND METHOD OF MOLDING

BACKGROUND OF THE INVENTION

The present invention relates to steering wheel molds that are employed to integrally mold covers and pads of steering wheels.

A typical steering wheel is constituted by a metal core and a cover, which is made of urethane foam or the like and which covers the core.

As shown in FIG. 23, in the prior art, a metal core 11 includes a boss plate 12 and spoke cores 13A, 13B, 13C, which are formed by die casting aluminum. The ends of the boss plate 12 are embedded in the spoke cores 13B, 13C to connect the boss plate 12 with the spoke cores 13B, 13C.

A boss 14 is provided by welding a boss body 15 to the boss plate 12. To embed the boss plate 12, the boss 14 and a wheel core 16, which is formed separately from the boss 14, are arranged in a mold (not shown).

Molten aluminum is then charged into a cavity defined in the mold. The spoke cores 13A–13C, boss connectors 21, spoke connectors 22, and a supporter core 24 are formed when the aluminum cools and hardens. The supporter core 24 is connected to the boss plate 12 by two reinforcing bars 25. The spoke cores 13B, 13C are connected to the spoke core 13A by the spoke connectors 22.

This structure securely connects the spoke cores 13A–13C, the wheel core 16, and the boss 14 to one another. Furthermore, a relatively large opening 23 is defined between the boss 14, the boss connectors 21, and the spoke connectors 22.

As shown in FIG. 25, a steering wheel W includes a gripping wheel 81, which is formed by covering the wheel core 16 with a cover, and spokes 82, which are formed by covering each spoke core 13A–13C with a cover. The gripping wheel 81 and the spokes 82 constitute a wheel body 84. A space is provided between the spokes 82 and the reinforcing bars 25 to accommodate an air bag device. The space is closed by a pad 85.

In the above prior art steering wheel W, the pad 85, and the wheel body 84 are formed separately. This increases the number of manufacturing steps and increases costs. In addition, the pad 85 and the wheel body 84 each require a different mold. This further increases costs.

To mold the pad 85 integrally with the wheel body 84, a pad mold must be arranged adjacent to the place where the pad 85 is located. However, the arrangement of a pad mold would be hindered by the boss plate 12, which is opposed to the pad 85, the supporter core 24, and the reinforcing bar 25. Furthermore, a pad mold would obstruct the opening and closing of the molds used to mold the wheel body 84. Thus, despite the additional costs, it has heretofore been necessary to form the pad 85 and the wheel body 84 separately.

SUMMARY OF THE INVENTION

Accordingly, it is an objective of the present invention to provide a steering wheel mold that enables integral molding of the wheel body cover and the pad while also reducing costs.

To achieve the above objective, the present invention provides a mold apparatus for integrally molding a cover and a pad of a steering wheel. The steering wheel includes a metal core. The metal core is at least partially covered by the cover. The apparatus includes a first mold and a second mold being relatively movable to the first mold in a first direction. The first and second molds are separated from each other to arrange the metal core between the first and second molds. The first and second molds are joined with each other after arranging the metal core between the first and second molds to define a first cavity for molding the cover. The first and second molds are again separated from each other to remove the metal core and the cover. A float core is located between the first and second molds. The float core cooperates with the first and second molds to define a second cavity for molding the pad when the first and second molds are joined with each other. A pivoting mechanism pivots either one of the float core and the metal core about an axis perpendicular to the first direction to remove the metal core covered by the molded cover.

In another aspect of the present invention, a method for integrally molding a cover and a pad on a steering wheel is provided. The steering wheel includes the cover and a metal core at least partially covered by the cover. The method includes the steps of (a) separating a first mold and a second mold from each other and inclining a float core between the first and second molds, (b) arranging the metal core between the first and second molds and inserting the float core into a space formed in the metal core, (c) pivoting the float core to a molding position to engage the float core with part of the metal core and to position the metal core between the first and second molds, (d) joining the first and second molds with each other to define a cavity between the first and second molds and the float core, (e) charging the cavity with molten resin material to mold the cover with the resin material and to mold the pad integrally with the cover, (f) separating the first and second molds from each other and releasing the metal core, and (g) inclining the float core again to allow removal of the metal core and the integral cover and pad from the first and second molds.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 23:
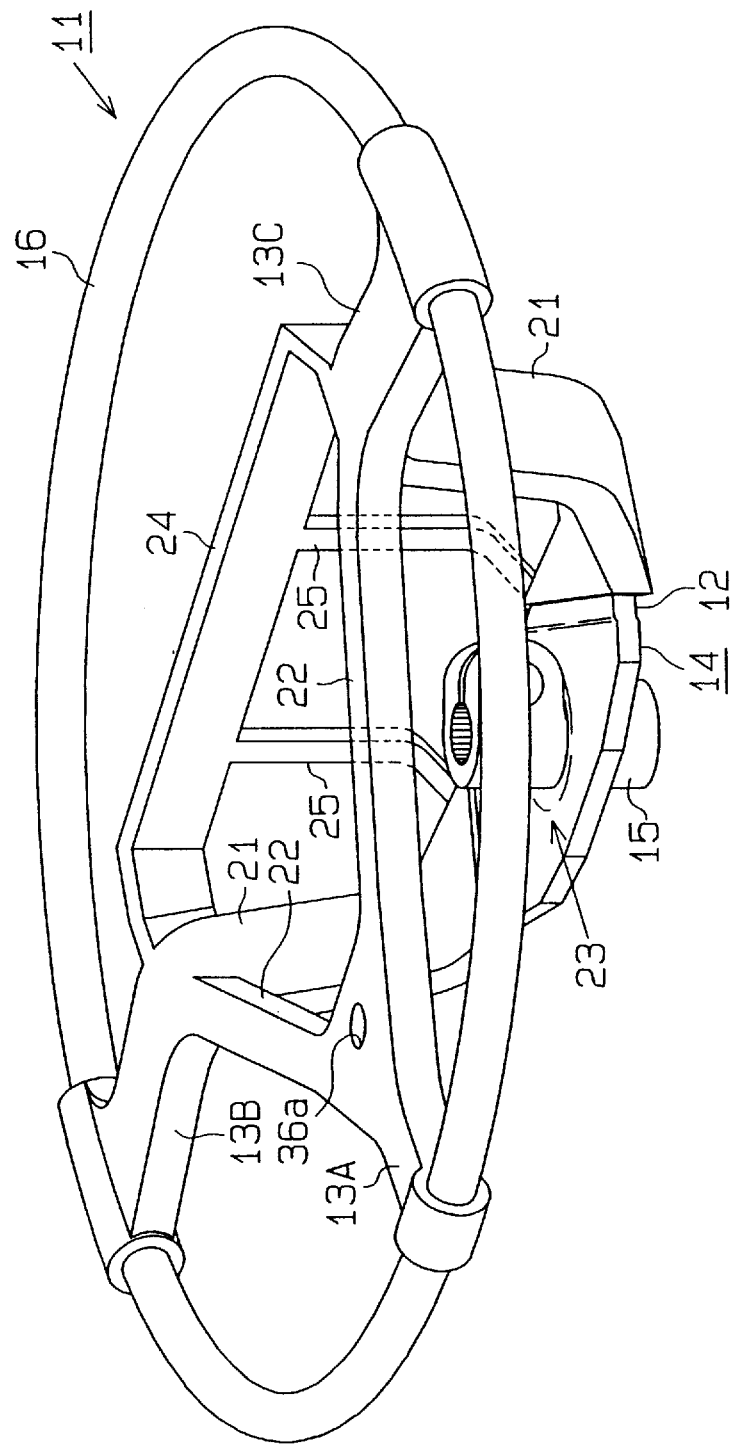
FIG. 23 is a perspective view showing the prior art metal core.
Figure 24A:
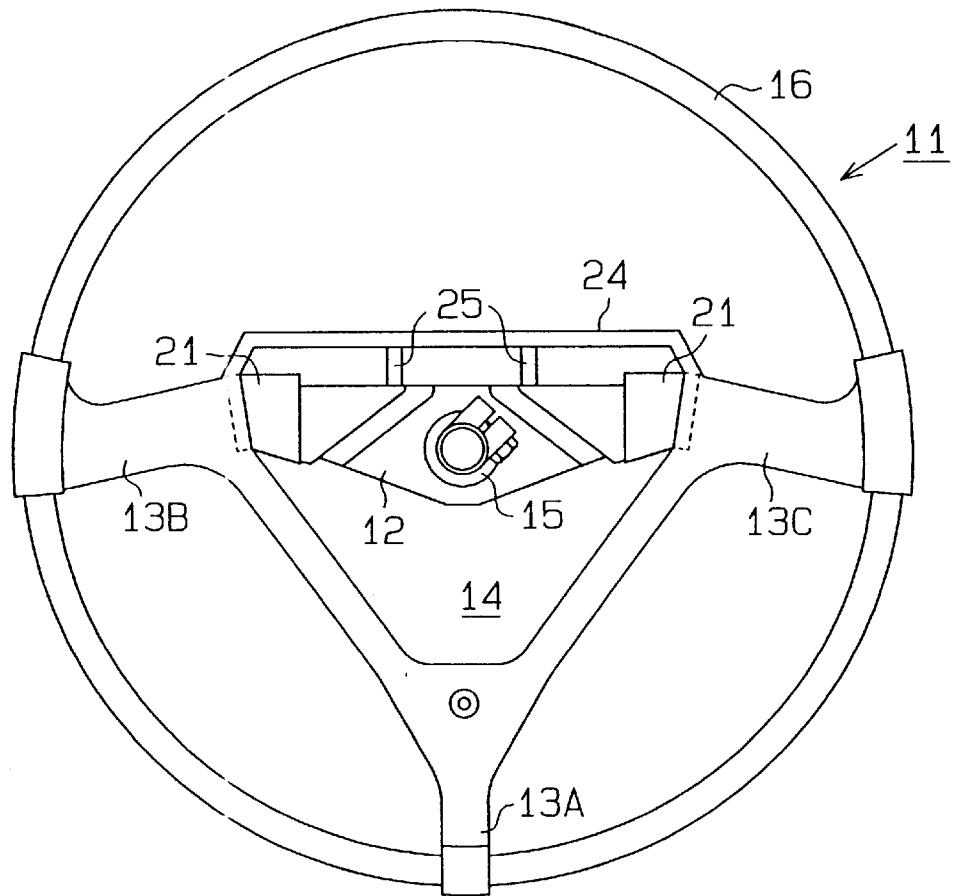
FIG. 24(a) is a plan view showing the metal core employed in the steering wheel of FIG. 1.
Figure 24B:
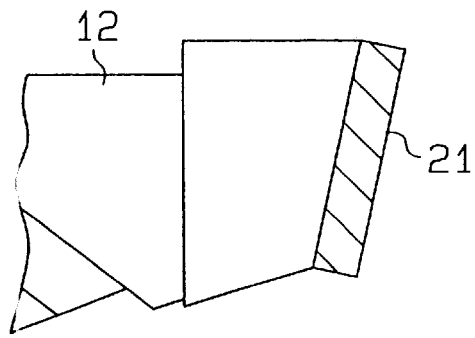
FIG. 24(b) is a partial cross-sectional view showing the connector employed in the steering wheel of FIG. 24(a)
Figure 25:
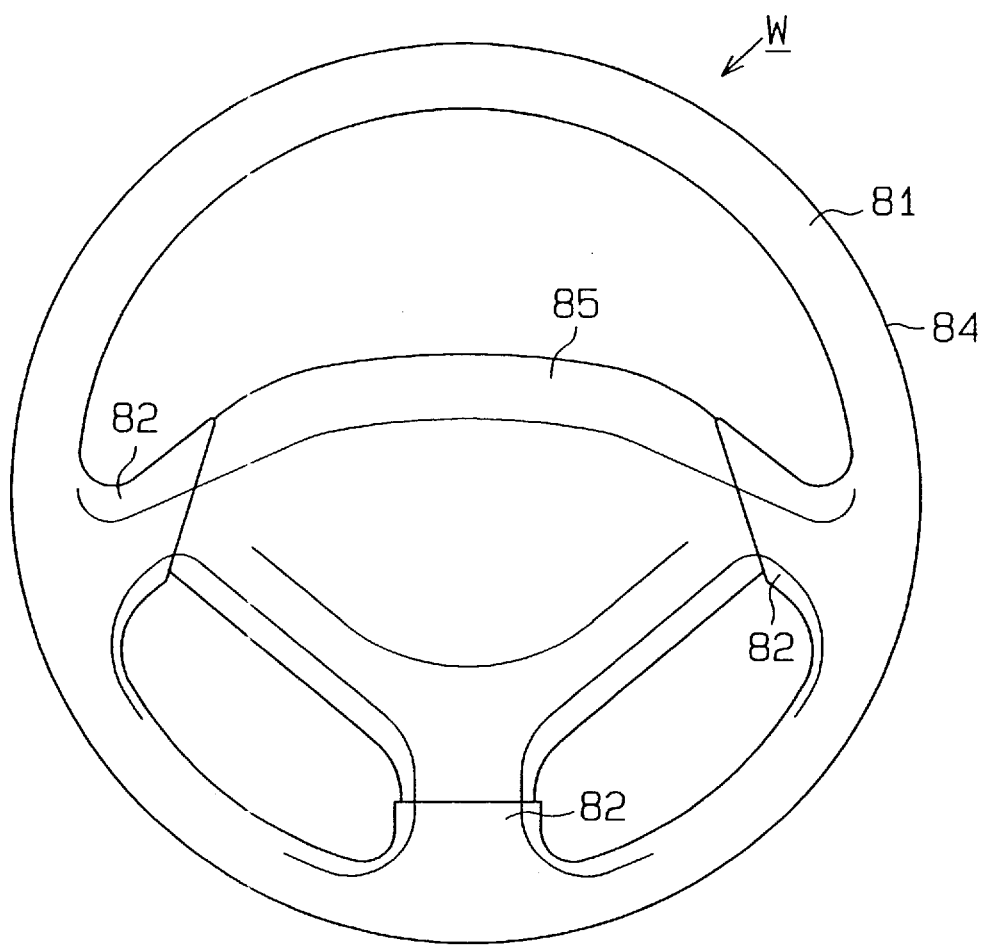
FIG. 25 is a plan view showing the prior art steering wheel.

A preferred embodiment according to the present invention will now be described with reference to the drawings. In the preferred embodiment, a steering wheel is constituted by a metal core, the structure of which is substantially the same as the prior art metal core 11 shown in FIG. 23. As shown in FIGS. 24(a) and 24(b), the core 11 of the preferred embodiment is also provided with the boss connectors 21. The distance between the boss connectors 21 gradually becomes wider at positions located farther from the spoke core 13A. Furthermore, each boss connector 21 is inclined so that its lower end is located inward from its upper end.

As shown in FIGS. 1, 2, 24(a), and 24(b), a steering wheel W is constituted by a wheel body 1. The wheel body 1 includes an annular gripping wheel 2, a pad 3 located at the center of the gripping wheel 2, and three spokes 4 extending from the gripping wheel 2. The gripping wheel 2 includes a wheel core 16 and a wheel cover 7a, which covers the core 16. The spokes 4 include spoke cores 13A, 13B, 13C and a cover 7b, which covers the spoke cores 13A, 13B, 13C. The covers 7a, 7b and the pad 3 are molded integrally from a soft synthetic resin such as urethane foam.

An accommodating space 31 surrounded by the spoke cover 7b is provided under the pad 3 to accommodate an air bag device 32. The air bag device 32 includes a folded air bag 33, an inflator 34, and a bag holder 37. The inflator 34 inflates the air bag 33 with gas. The bag holder 37 securely holds the air bag 33 and the inflator 34 and is fastened to a fastening portion 36 of the spoke core 13A by a screw 35.

The wheel body 1 and the pad 3 of the steering wheel W are molded integrally. This structure reduces the number of components and simplifies assembly of the steering wheel W. As a result, production costs are significantly decreased.

A mold employed to cover the metal core 11 with the wheel cover 7a and the spoke cover 7b will now be described.

As shown in FIGS. 3 to 7, the mold includes an upper mold 51, a lower mold 52, and a float core 53. A cavity S is defined between the upper mold 51, the lower mold 52, and the float core 53 to mold the covers 7a, 7b and the pad 3. The cavity S includes a first portion S1 and a second portion S2. The first portion S1 forms the wheel and spoke cores 7a, 7b while the second portion S2 forms the pad 3. The float core 53 has a molding portion 54, a pair of spaced supporting portions 55, which project from the lower surface of the molding portion 54, and a bearing portion 56, which extends horizontally from each supporting portion 55. A space 65 is defined between the lower surface of the molding portion 54, the supporting portions 55, and the upper surfaces of the bearing portions 56.

Figure 1:
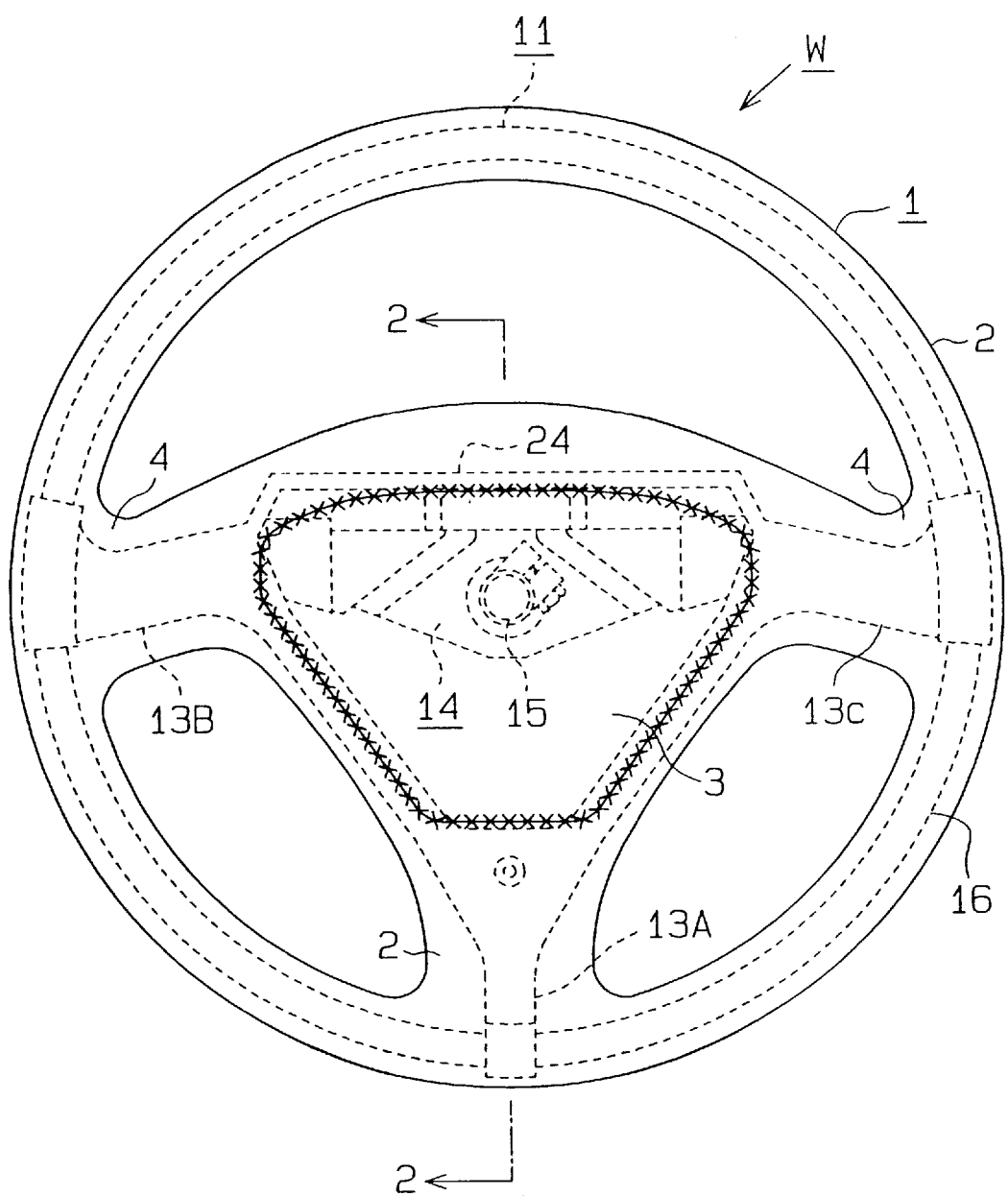
FIG. 1 is a plan view showing a steering wheel according to one embodiment of the present invention.
Figure 2:
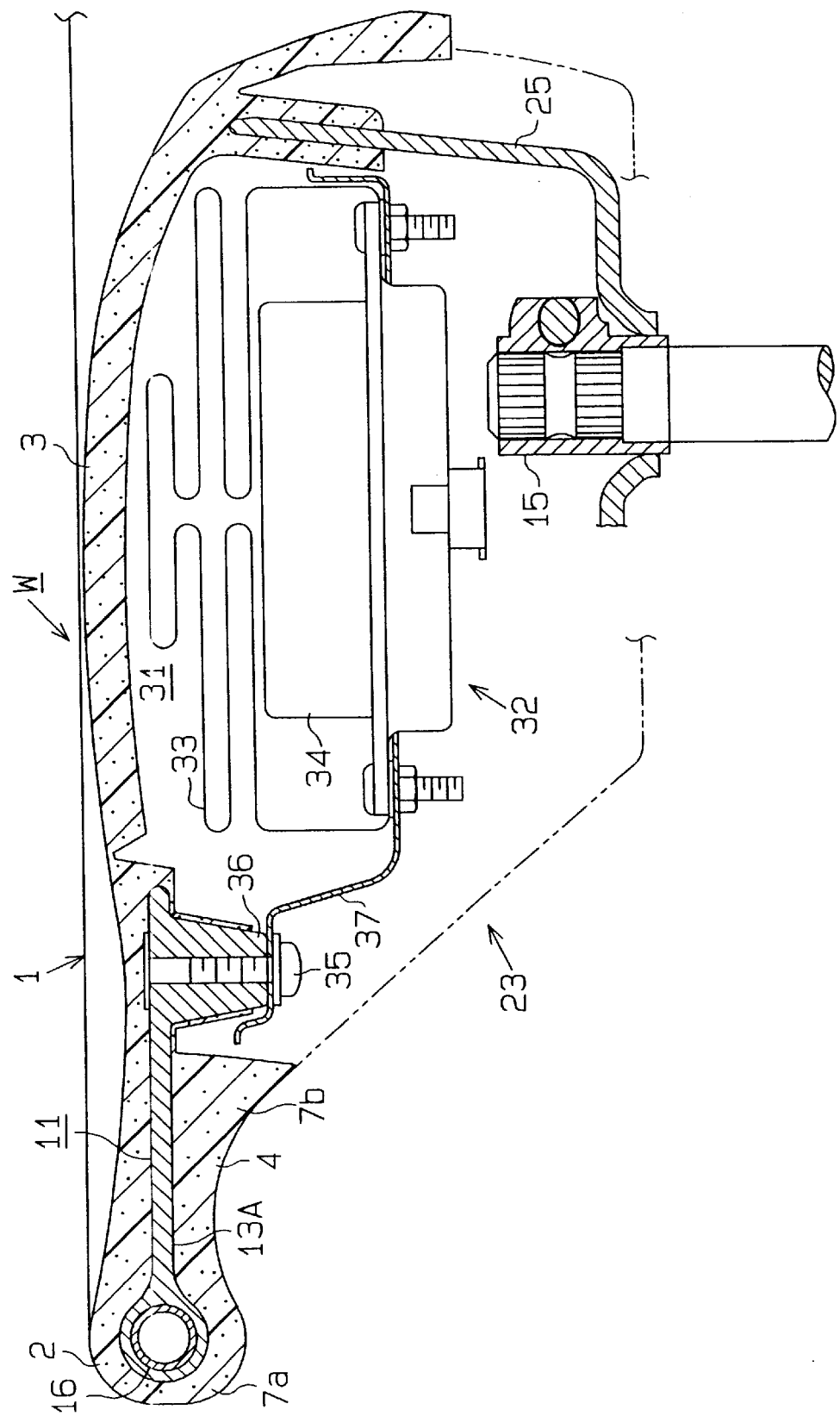
FIG. 2 is an enlarged cross-sectional view taken along line 2—2 in FIG. 1.
Figure 3:
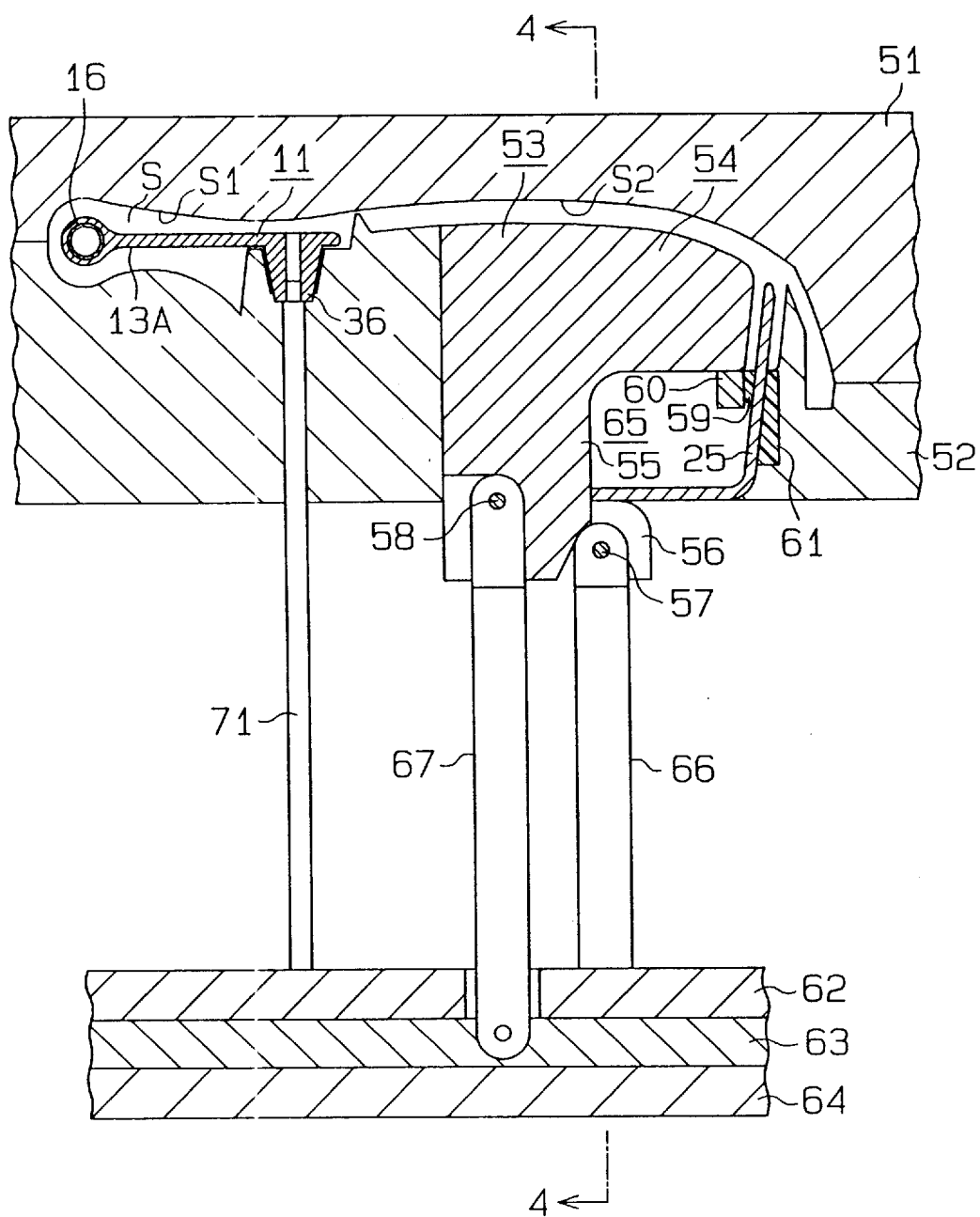
FIG. 3 is a cross-sectional view showing a closed mold and a metal core.
Figure 4:
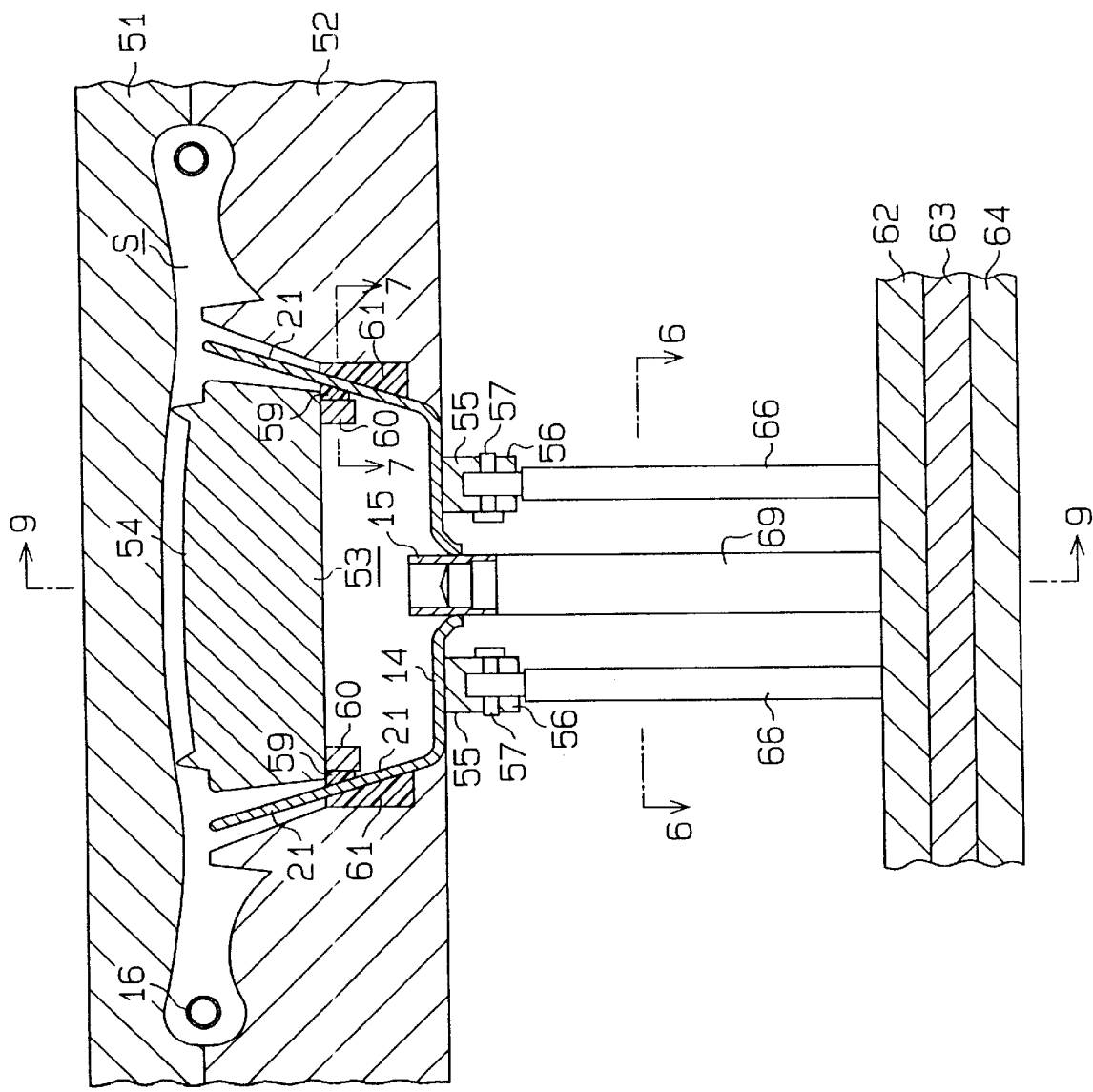
FIG. 4 is a cross-sectional view taken along line 4—4 in FIG. 3.
Figure 5:
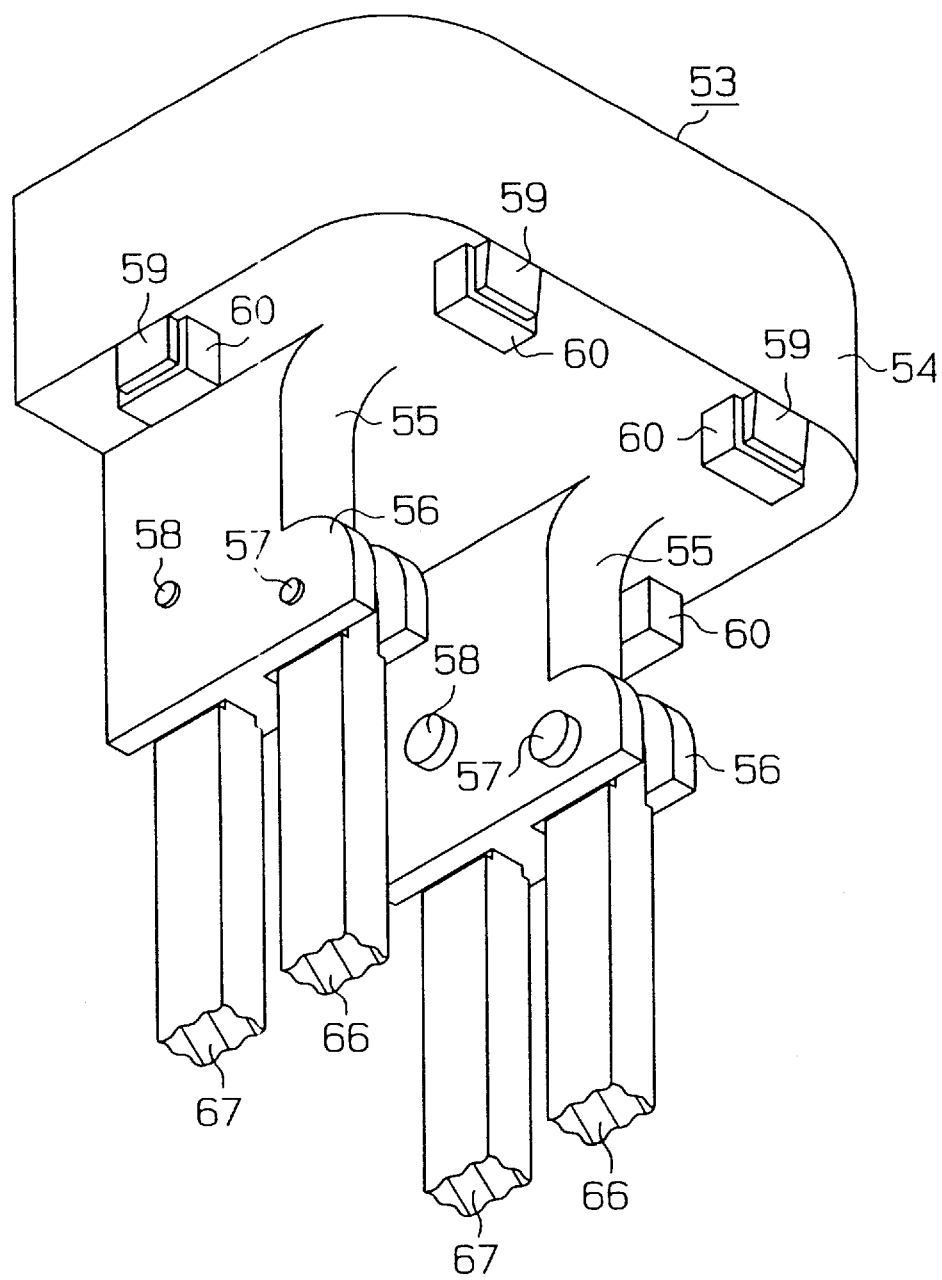
FIG. 5 is a perspective view taken showing a float core.
Figure 14:
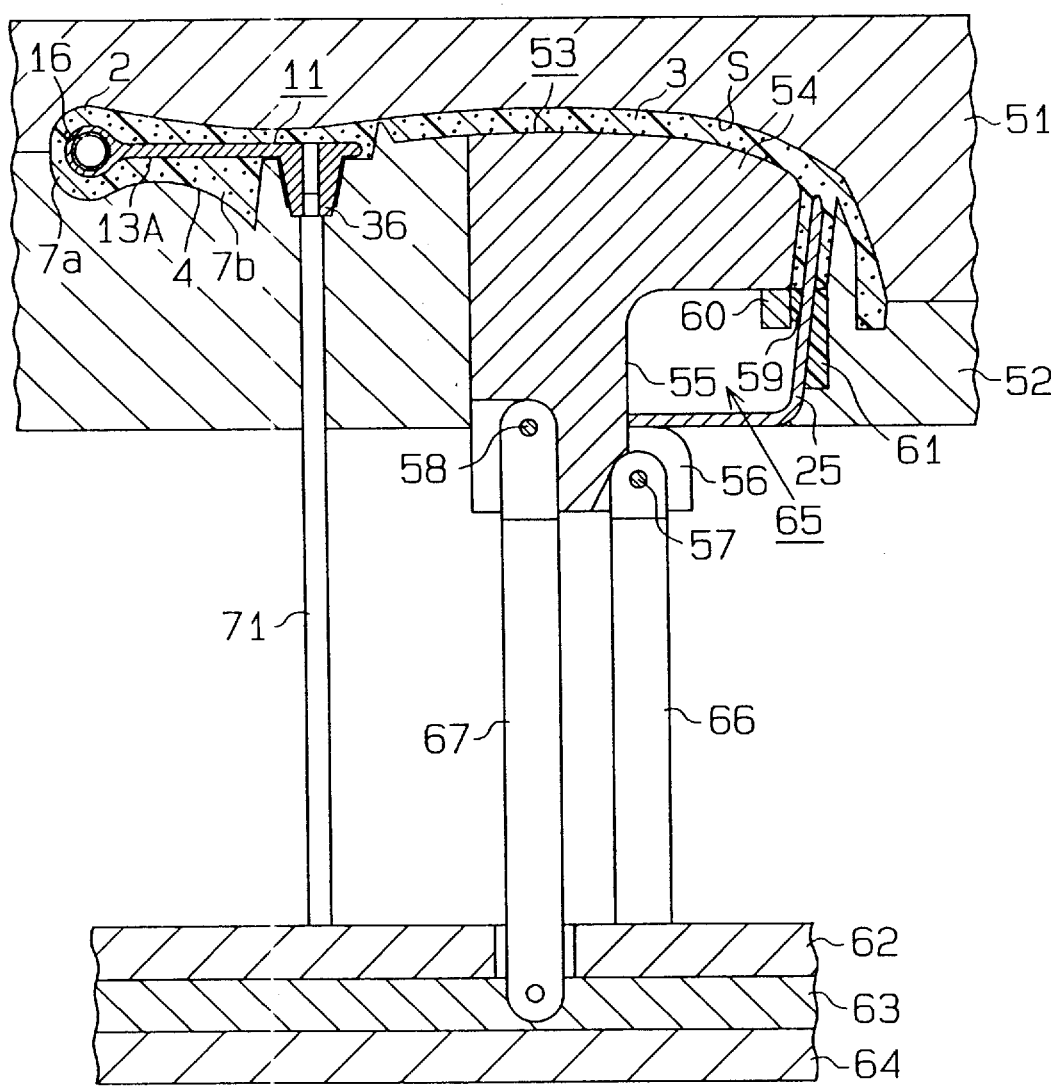
FIG. 14 is a partial cross-sectional view showing the mold and the core in the fourth step.

The width of the molding portion 54 is substantially equal to the width of the opening 23 provided in the metal core 53. When molding the wheel and spoke covers 7a, 7b, the molding portion 54 is accommodated in the opening 23. When the mold is closed (i.e., when the upper and lower molds 51, 52 abut against each other), the upper surfaces of the bearing portions 56 are flush with the lower surface of the lower mold 52, as shown in FIGS. 4 and 14. A first pin 57 and a second pin 58 extend through each bearing portion 56. The first and second pins 57, 58 are diagonally offset from each other.

Seals 59 are applied to fixed portions 60, which are fixed to the float core 53, while seals 61 are applied to the lower mold 52. The seals 59, 61 are formed of soft synthetic resin (e.g., urethane resin) and clamp the boss connectors 21 and the reinforcing bars 25 when the wheel and spoke covers 7a, 7b are molded.

A first rod plate 62, a second rod plate 63, and a base 64 are arranged one above the other below the lower mold 52. A drive mechanism (not shown) moves the first and second rod plates 62, 63 vertically and toward or away from the base 64 and toward or away from one another.

A first rod 66 is provided for each first support pin 57 of the float core 53 to connect the pin 57 to the first rod plate 62. A second rod 67 is provided for each second support pin 58 to connect the pin 58 to the second rod plate 63. A pressing shaft 68 is connected to the first rod plate 62 and extends upward from the plate 62. A setting shaft 69 is connected to the second rod plate 63 and extends upward from the plate 63.

Figure 6:
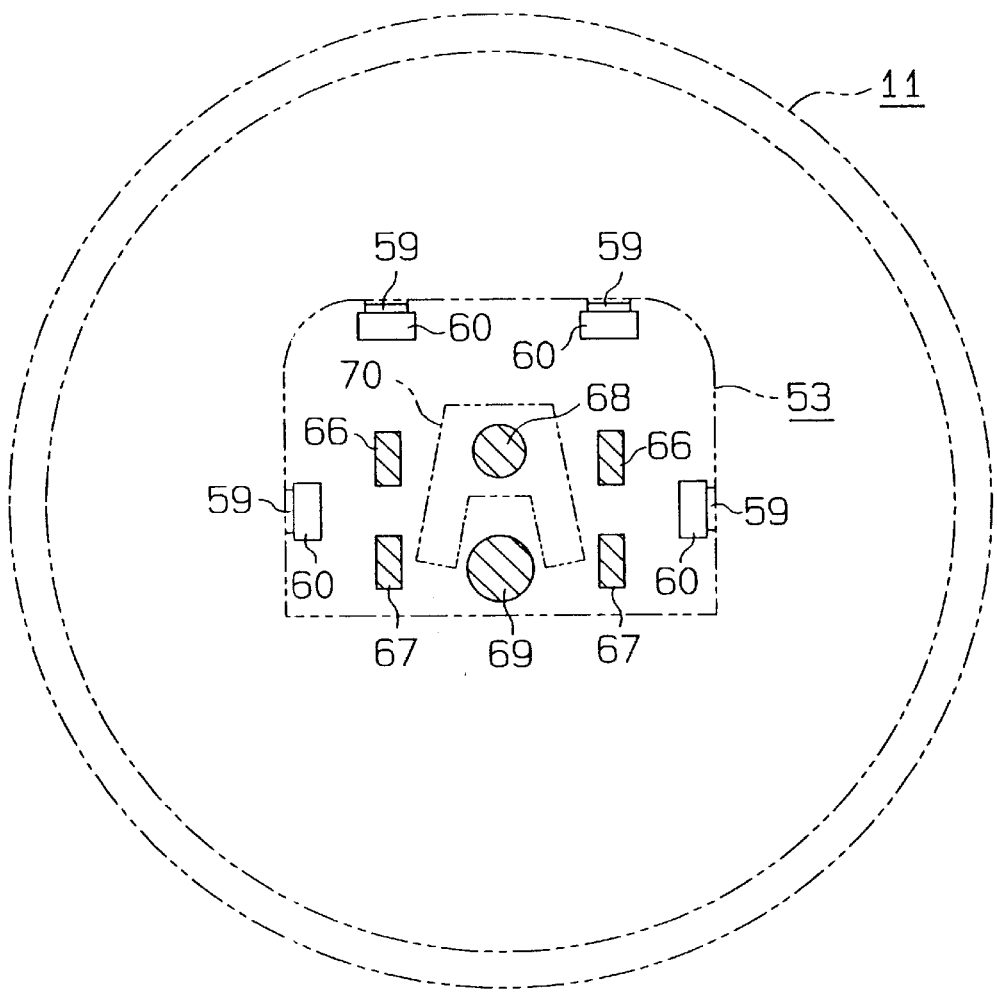
FIG. 6 is a cross-sectional view taken along line 6—6 in FIG. 5 and showing the locations of rods and pins.
Figure 7:
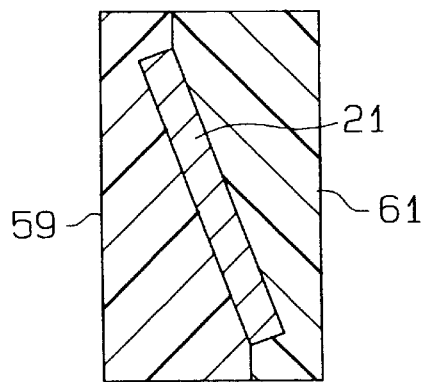
FIG. 7 is a partial cross-sectional view taken along line 7—7 in FIG. 4.
Figure 9:
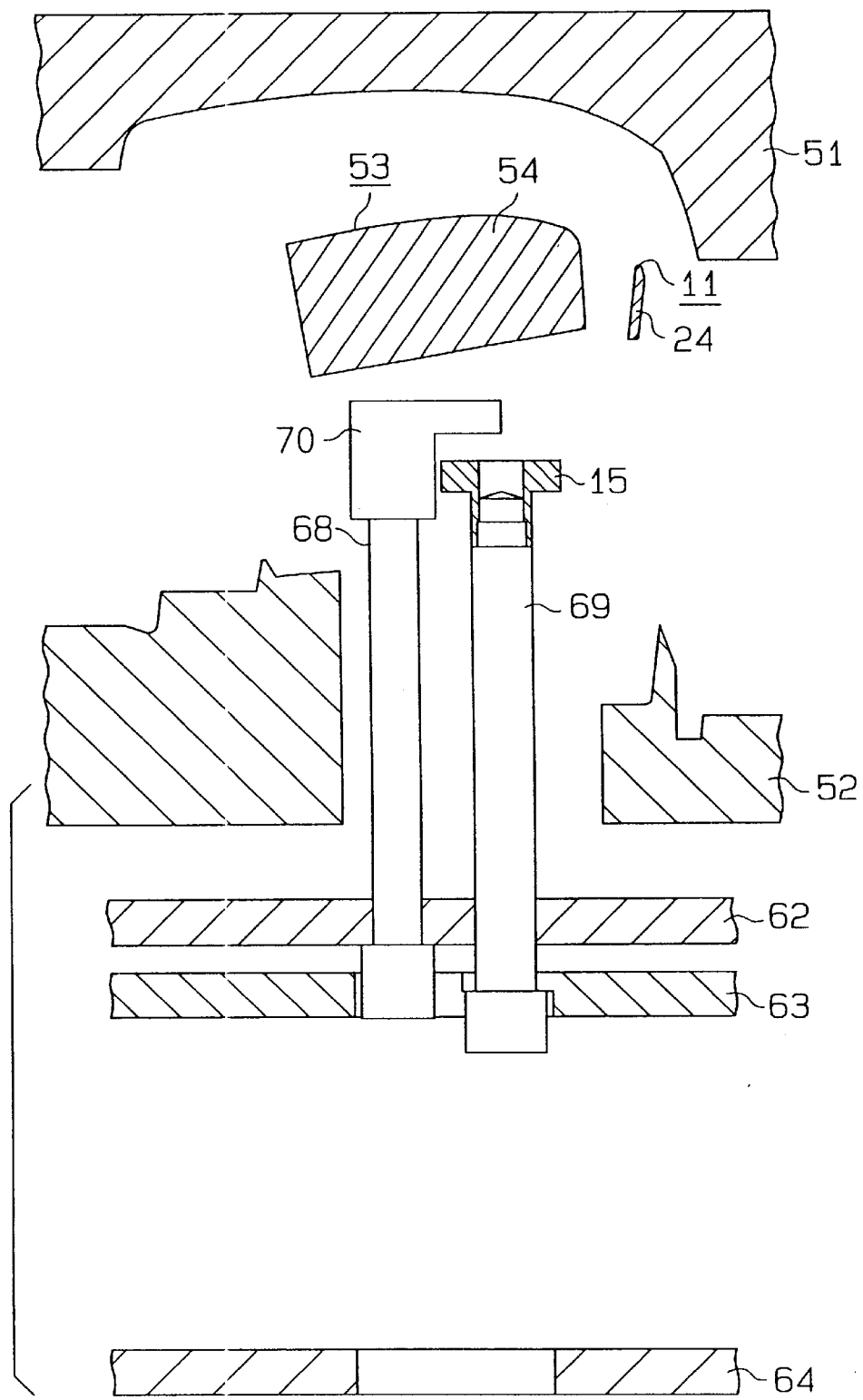
FIG. 9 is a partial cross-sectional view as seen along the plane represented by line 9—9 of FIG. 4 and shows the mold and the core in the first step.

The pressing and setting shafts 68, 69 are arranged between the first and second rods 66, 67. As shown in FIGS. 6 and 9, a V-shaped pressing plate 70 is attached to the distal end of the pressing shaft 68.

The steps of molding the covers 7a, 7b and the pad 3 with the illustrated mold will now be described.

Figure 8:
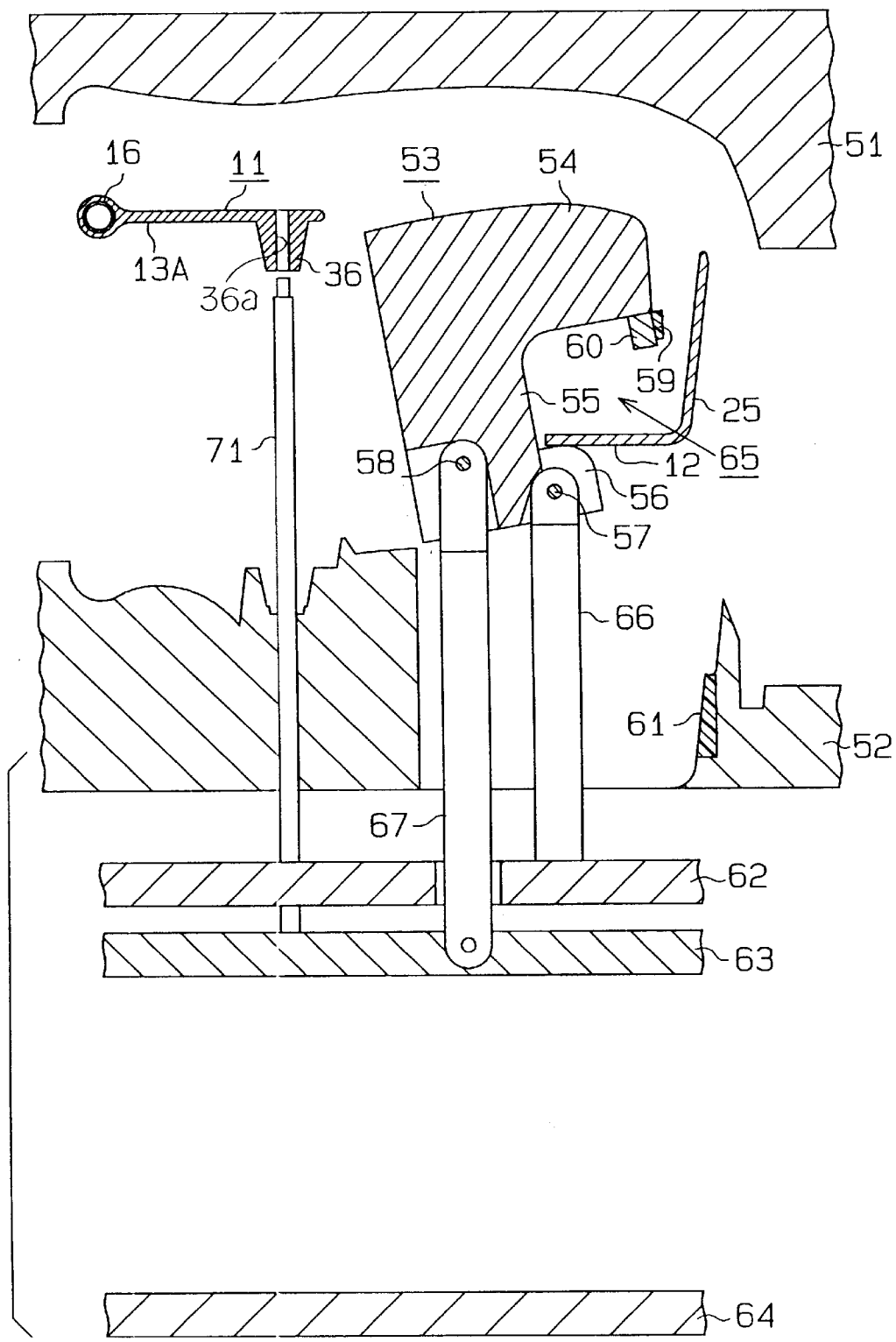
FIG. 8 is a partial cross-sectional view showing the mold and the core during a first step of a process for manufacturing the cover and the pad.

In the first step, the metal core 11 is set in the mold. To set the metal core 11, the upper and lower molds 51, 52 are separated from each other, as shown in FIGS. 8 and 9. The first rod plate 62 and the second rod plate 63 are lifted by a predetermined distance from the base 64. The first and second rod plates 62, 63 are also spaced apart from each other by a predetermined distance. This inclines the float core 53 with respect to the upper and lower molds 52. Thus, the space 65 is opened in an upward direction.

In this state, the metal core 11 is arranged between the upper and lower molds 51, 52 to accommodate the molding portion 54 in the opening 23, as shown in FIG. 8. The metal core 11 is then engaged with a positioning shaft 71 by inserting the shaft 71 in a bore 36a provided with the fastening portion 36 of the metal core 11. The lower surface of the boss plate 12 contacts the upper surfaces of the bearing portions 56. This enables the metal core 11 to be held at the position shown in FIGS. 8 and 9.

Figure 10:
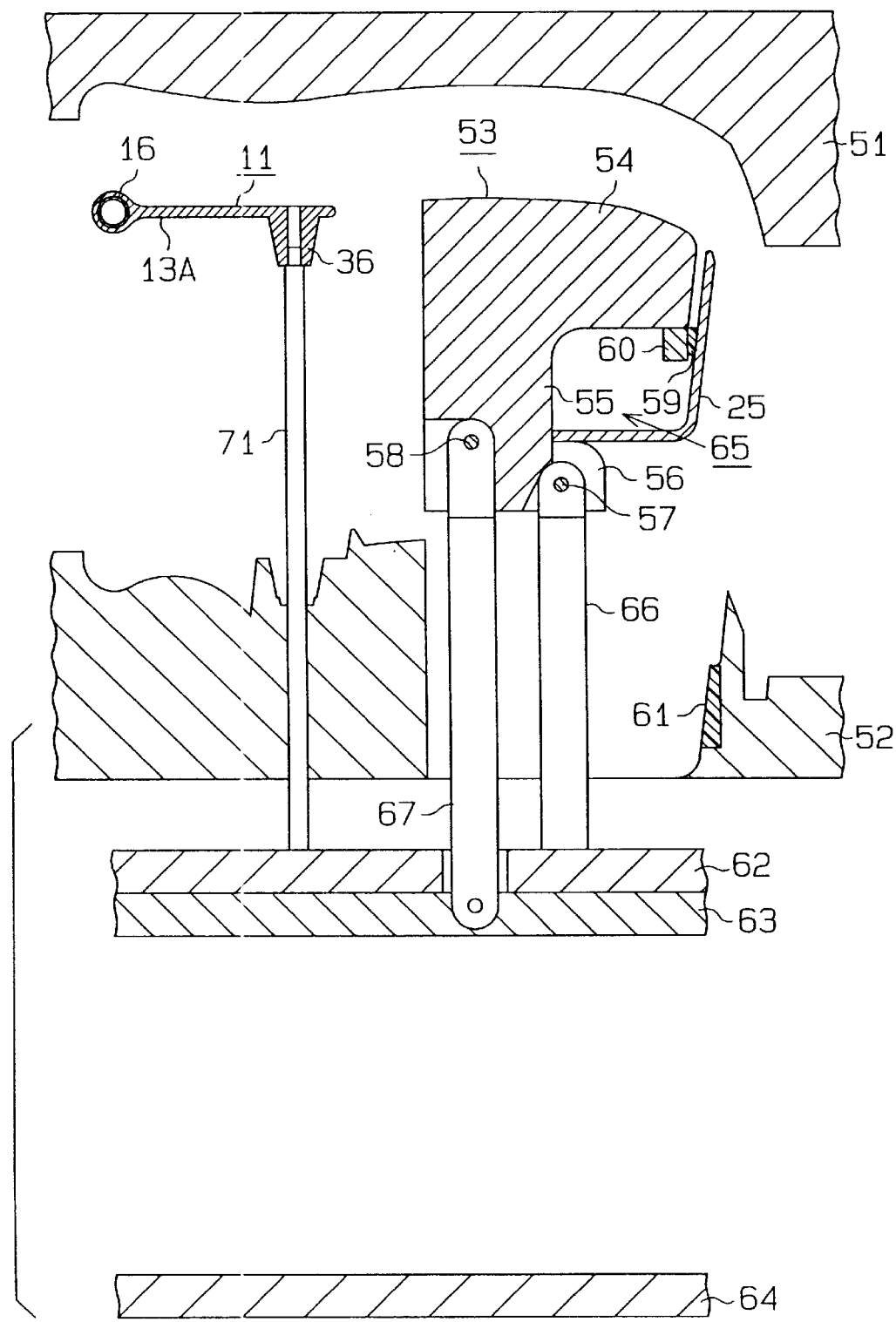
FIG. 10 is a partial cross-sectional view showing the mold and the core in the second step.
Figure 11:
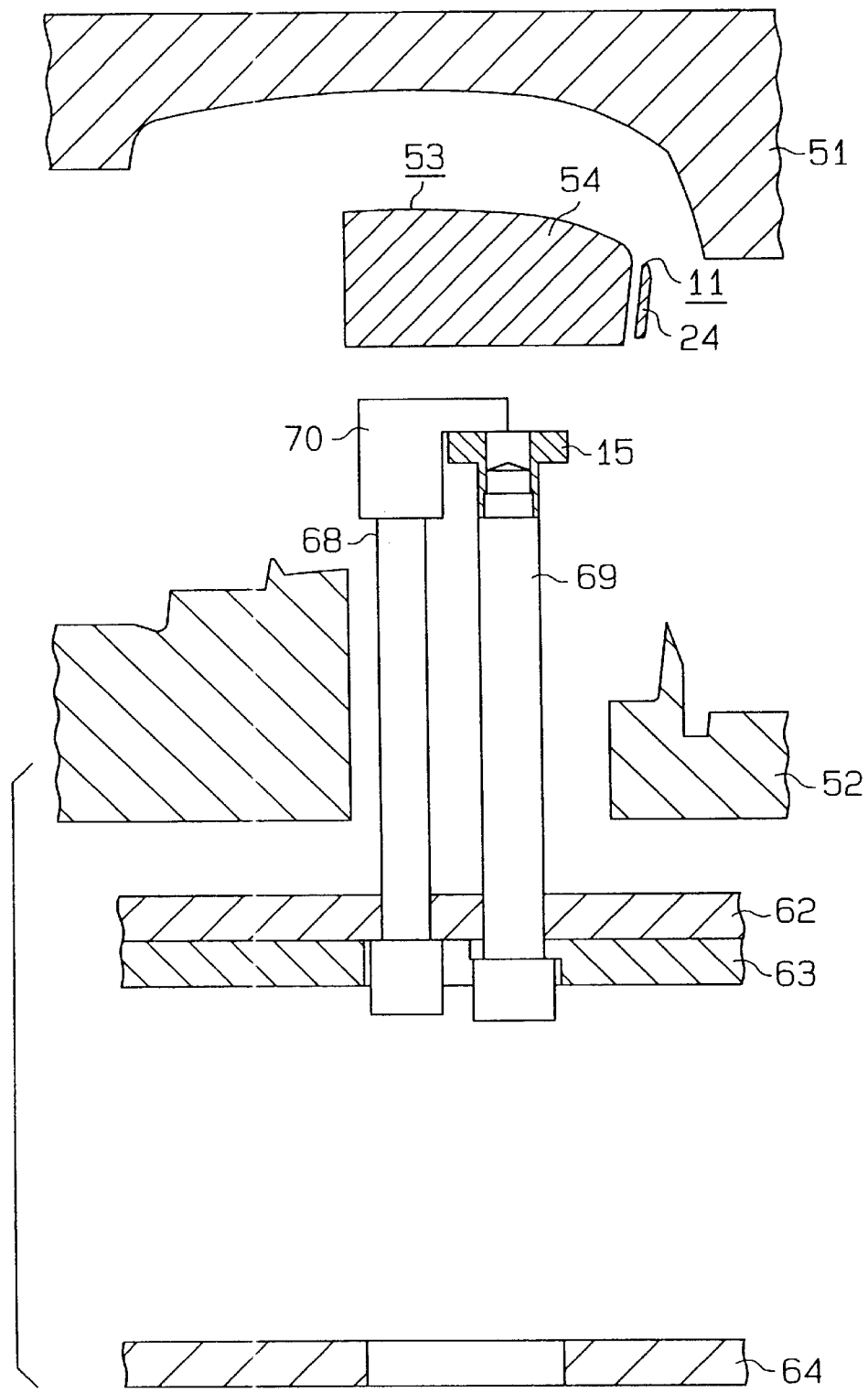
FIG. 11 is a partial cross-sectional view showing the mold and the core in the second step as viewed along a plane that differs from that of FIG. 10.

In the second step, the first rod plate 62 is lowered from the state of the first step until it contacts the second rod plate 63, as shown in FIGS. 10 and 11. This pivots the float core 53 in a clockwise direction from the position of FIG. 8 to the position of FIG. 10 and levels the float core 53. Simultaneously, the boss body 15 is clamped between the setting shaft 69 and the pressing plate 70 of the pressing shaft 70 to firmly hold the metal core 11. In this state, the seals 59 of the float core 53 are engaged with the inner side of the metal core 11.

Figure 12:
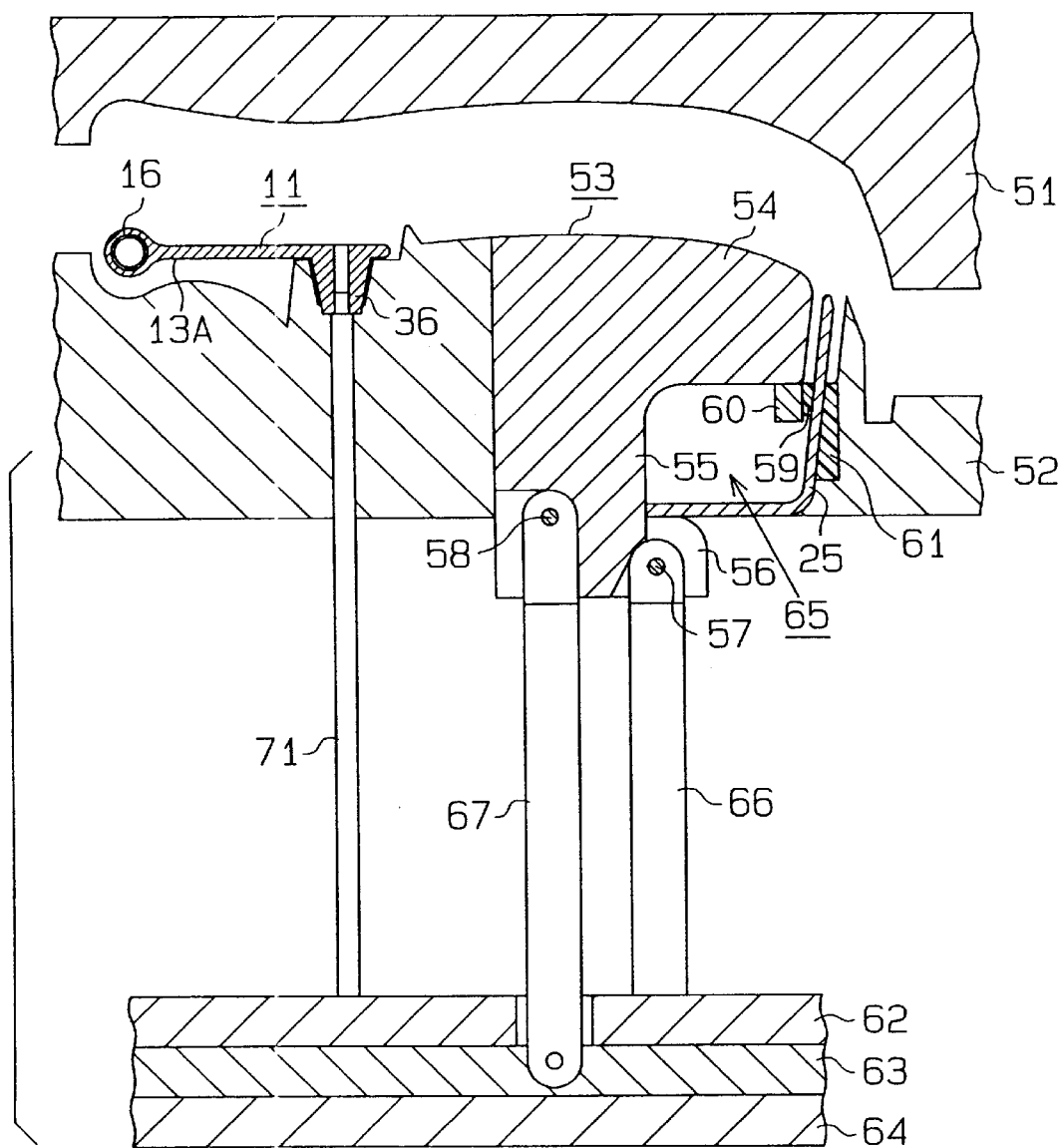
FIG. 12 is a partial cross-sectional view showing the mold and the core in the third step.
Figure 13:
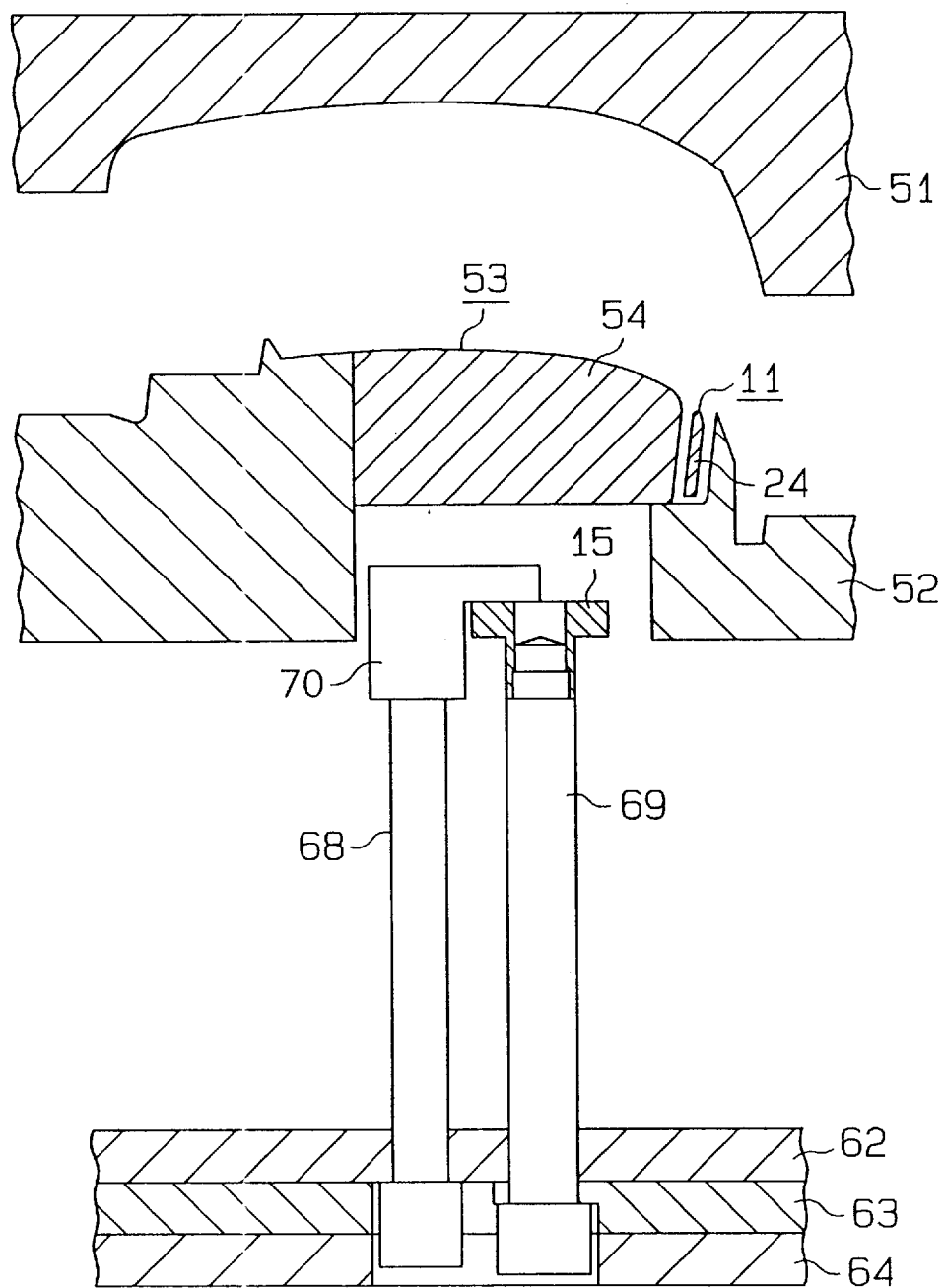
FIG. 13 is a partial cross-sectional view showing the mold and the core in the third step as viewed along a plane that differs from that of FIG. 12.

In the third step, the first and second rod plates 62, 63 are lowered from the state shown in FIGS. 10 and 11 until the rod plates 62, 63 are stacked on the base 64, as shown in FIGS. 12 and 13. The upper mold 51 is then lowered toward the lower mold 52 to close the mold, as shown in FIGS. 4 and 14.

Figure 15:
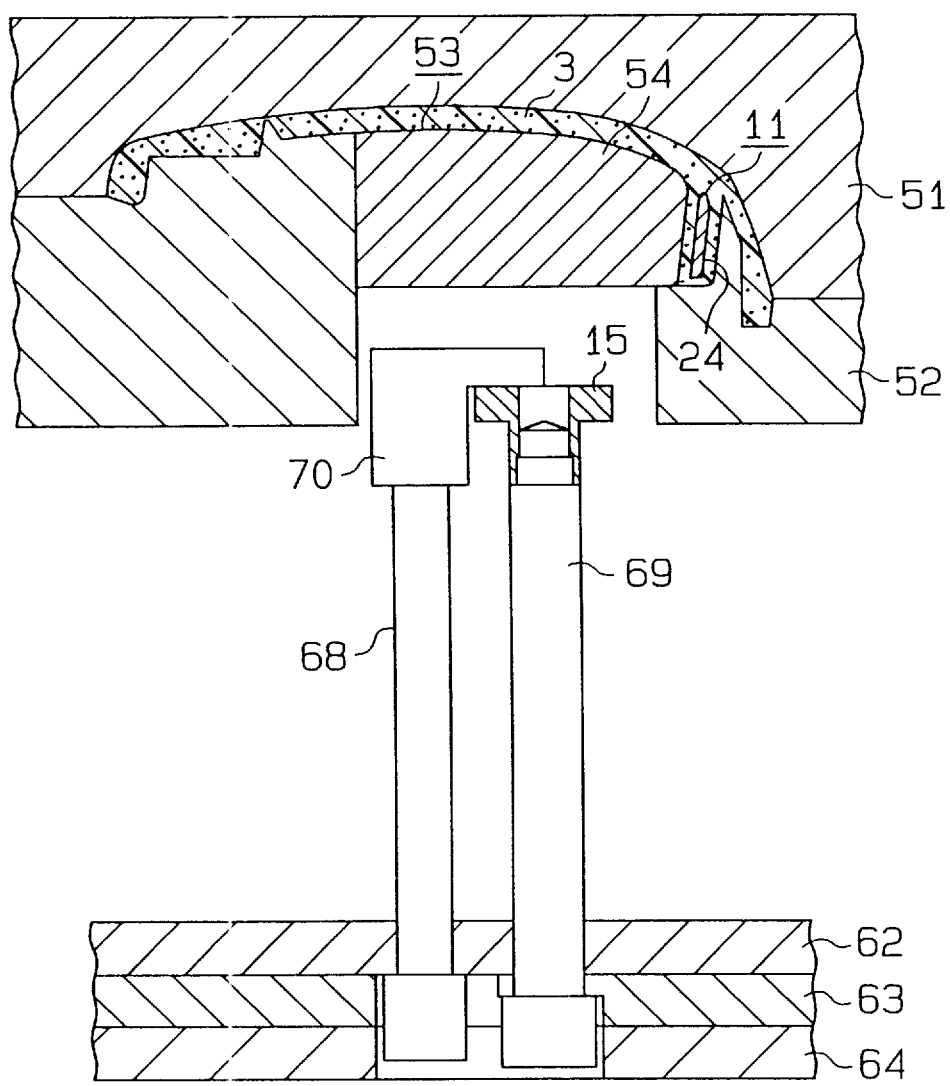
FIG. 15 is a partial cross-sectional view showing the mold and the core as viewed along a plane that differs from that of FIG. 14.

In the fourth step, the cavity S is charged with molten resin material to mold the wheel and spoke covers 7a, 7b of the metal core 11 and the pad 3, as shown in FIGS. 14 and 15.

Figure 16:
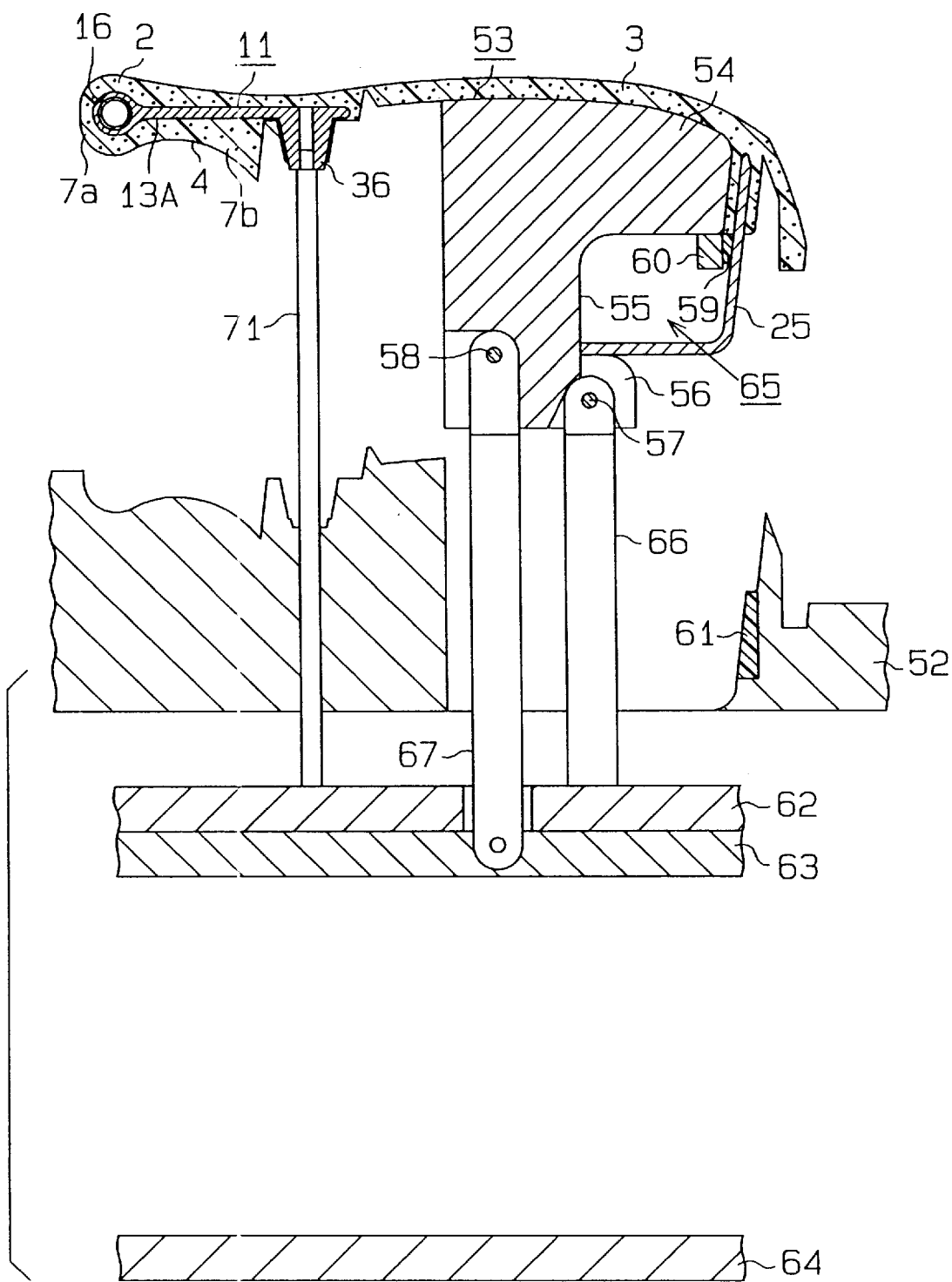
FIG. 16 is a partial cross-sectional view showing the mold and the molded product in the fifth step.
Figure 17:
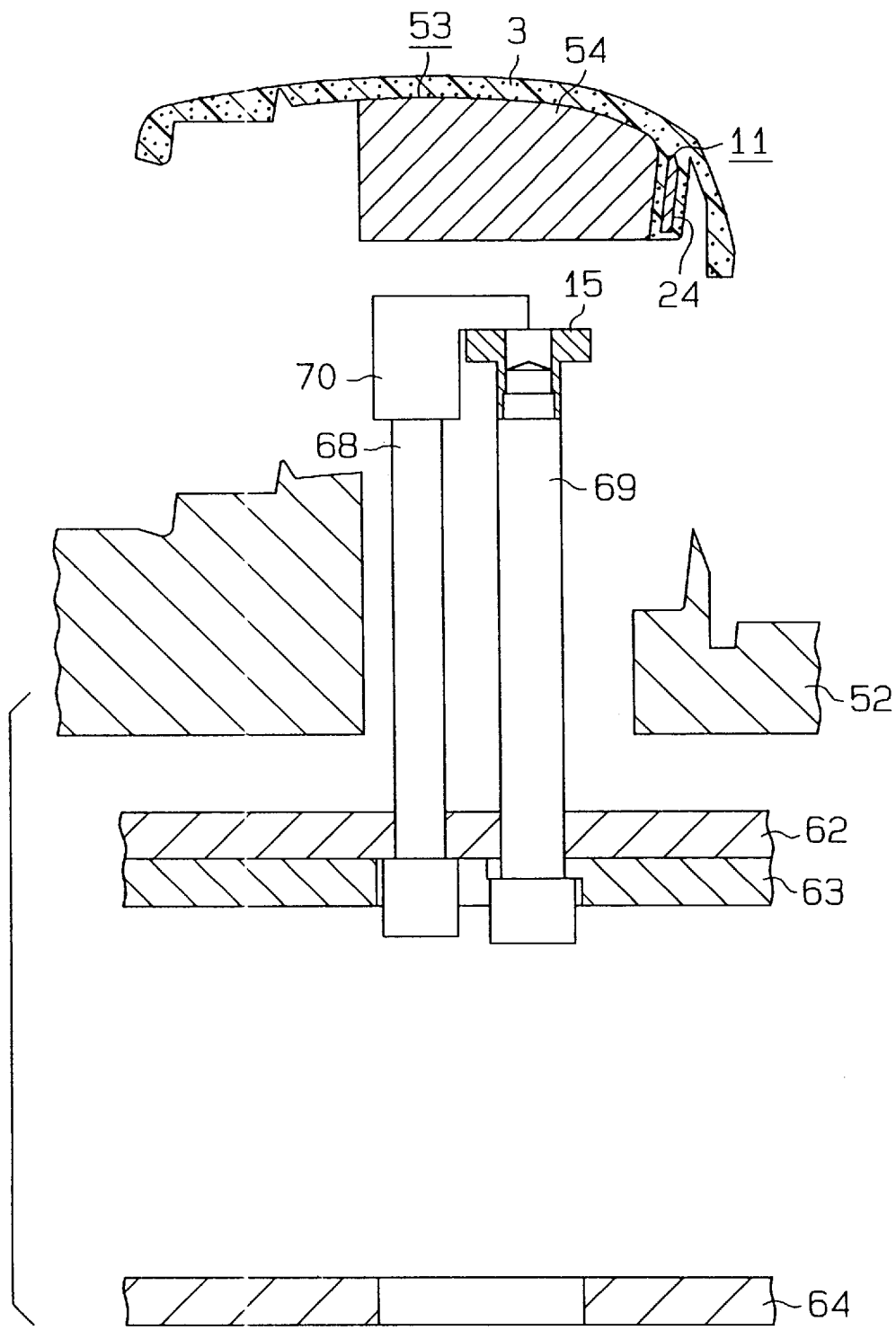
FIG. 17 is a partial cross-sectional view showing the mold and the molded product along a plane that differs from that of the view of FIG. 16.

In the fifth step, the mold is opened by separating the upper and lower molds 51, 52 from each other. The first and second rod plates 62, 63 are then lifted from the base 64 as shown in FIGS. 16 and 17. This separates the molded product from the upper and lower molds 51, 52, as shown in FIGS. 16 and 17.

Figure 18:
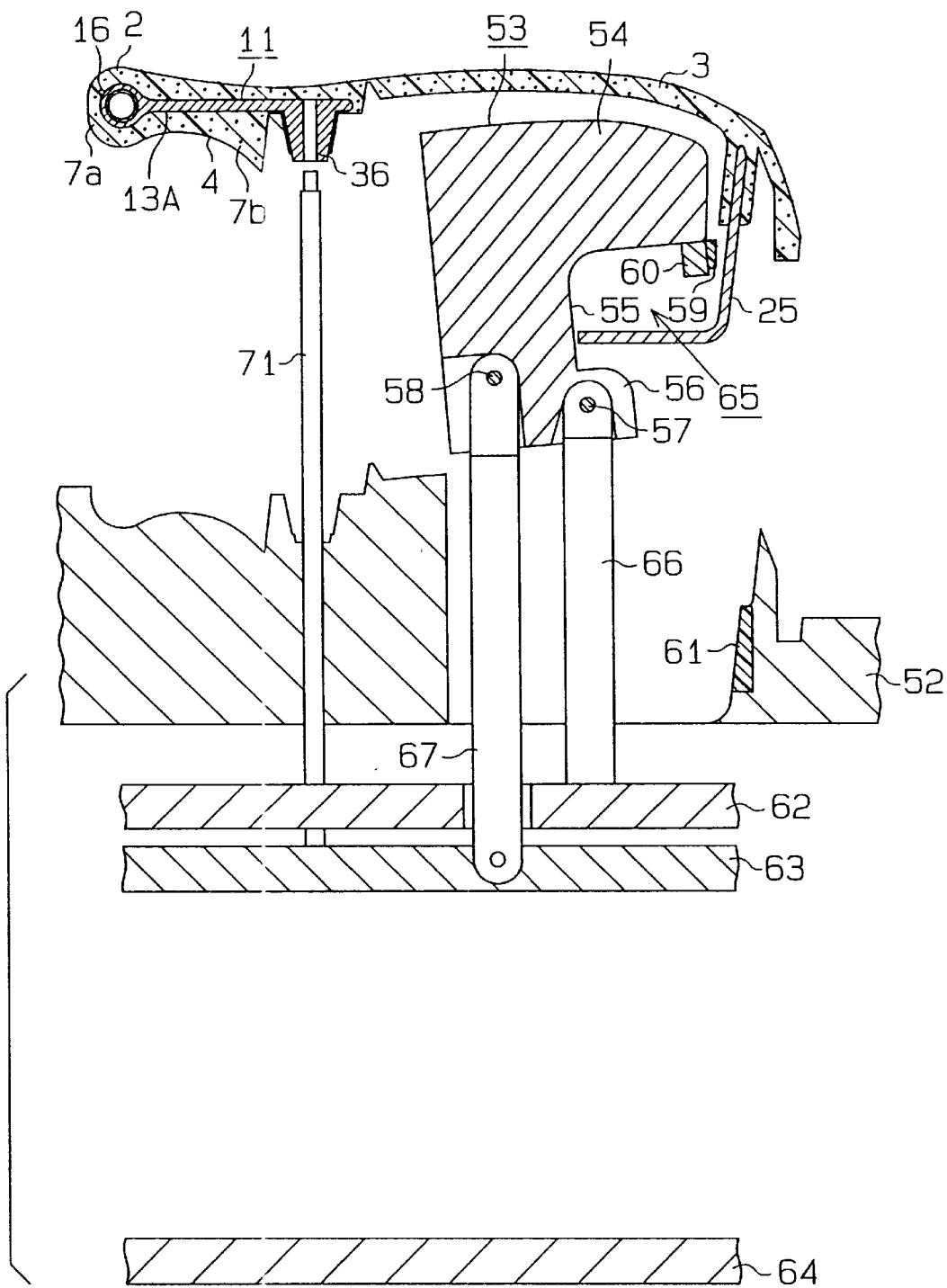
FIG. 18 is a partial cross-sectional view showing the mold and the molded product in the sixth step.
Figure 19:
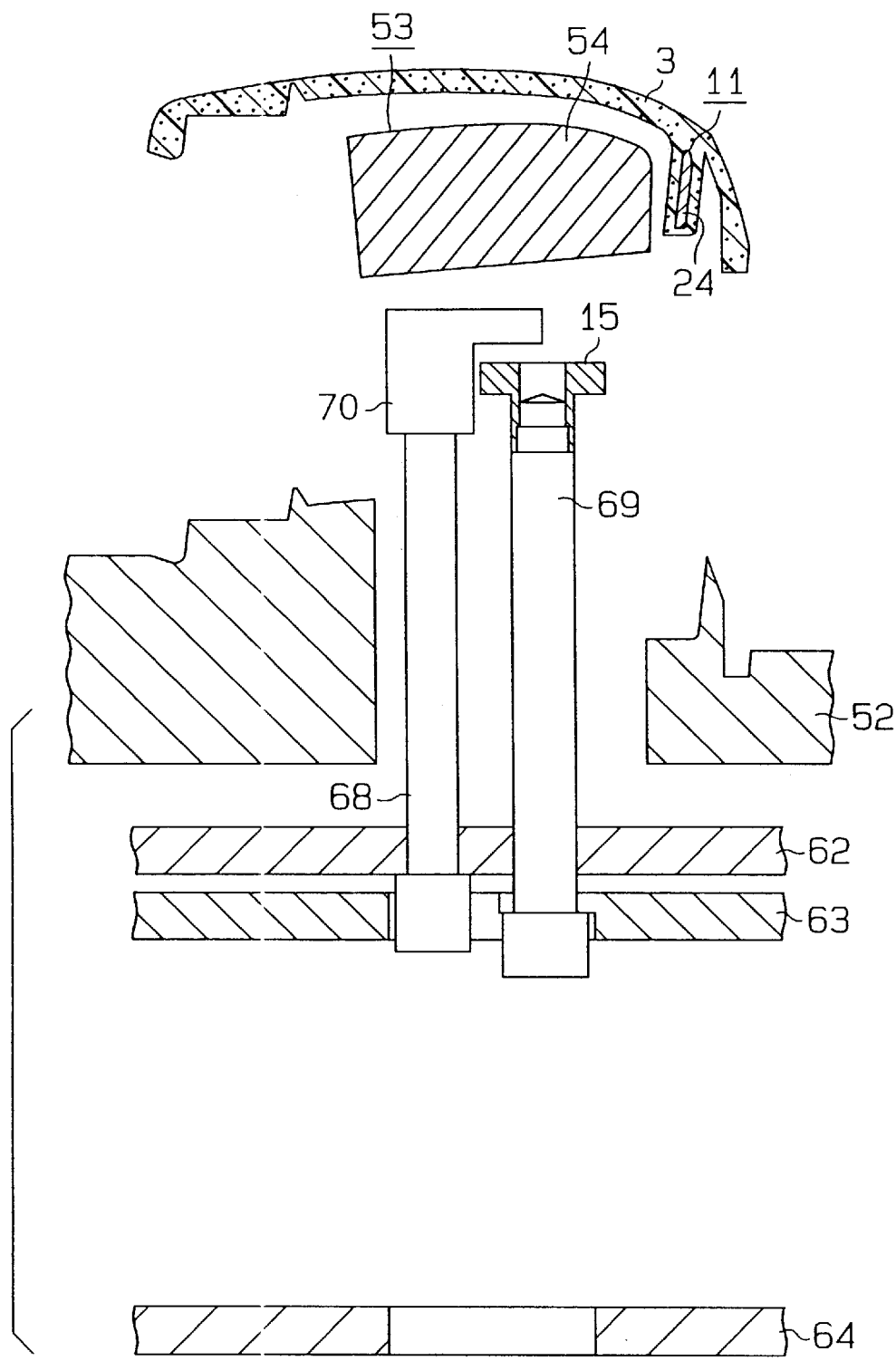
FIG. 19 is a partial cross-sectional view showing the mold and the molded product along a plane that differs from that of the view of FIG. 18.

In the sixth step, the second rod plate 63 is lowered slightly and separated from the first rod plate 62, as shown in FIGS. 18 and 19. This removes the positioning shaft 71 from the bore 36a of the fastening portion 36 and frees the boss body 15 that was clamped between the pressing plate 70 and the setting plate 69. Furthermore, the molding portion 54 of the float core 53 is separated from the wheel and spoke covers 7a, 7b.

Figure 20:
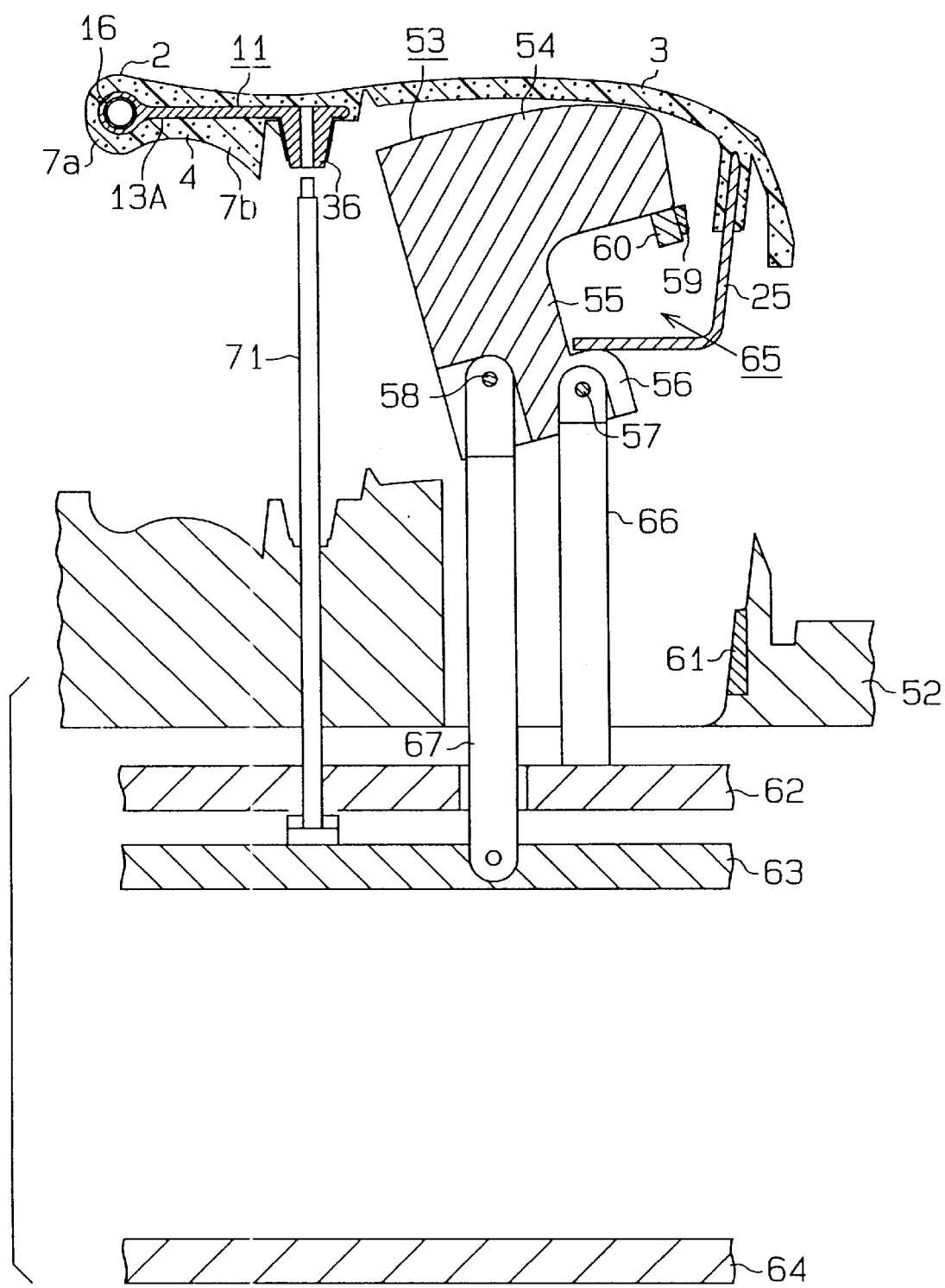
FIG. 20 is a partial cross-sectional view showing the mold and the molded product in the seventh step.
Figure 21:
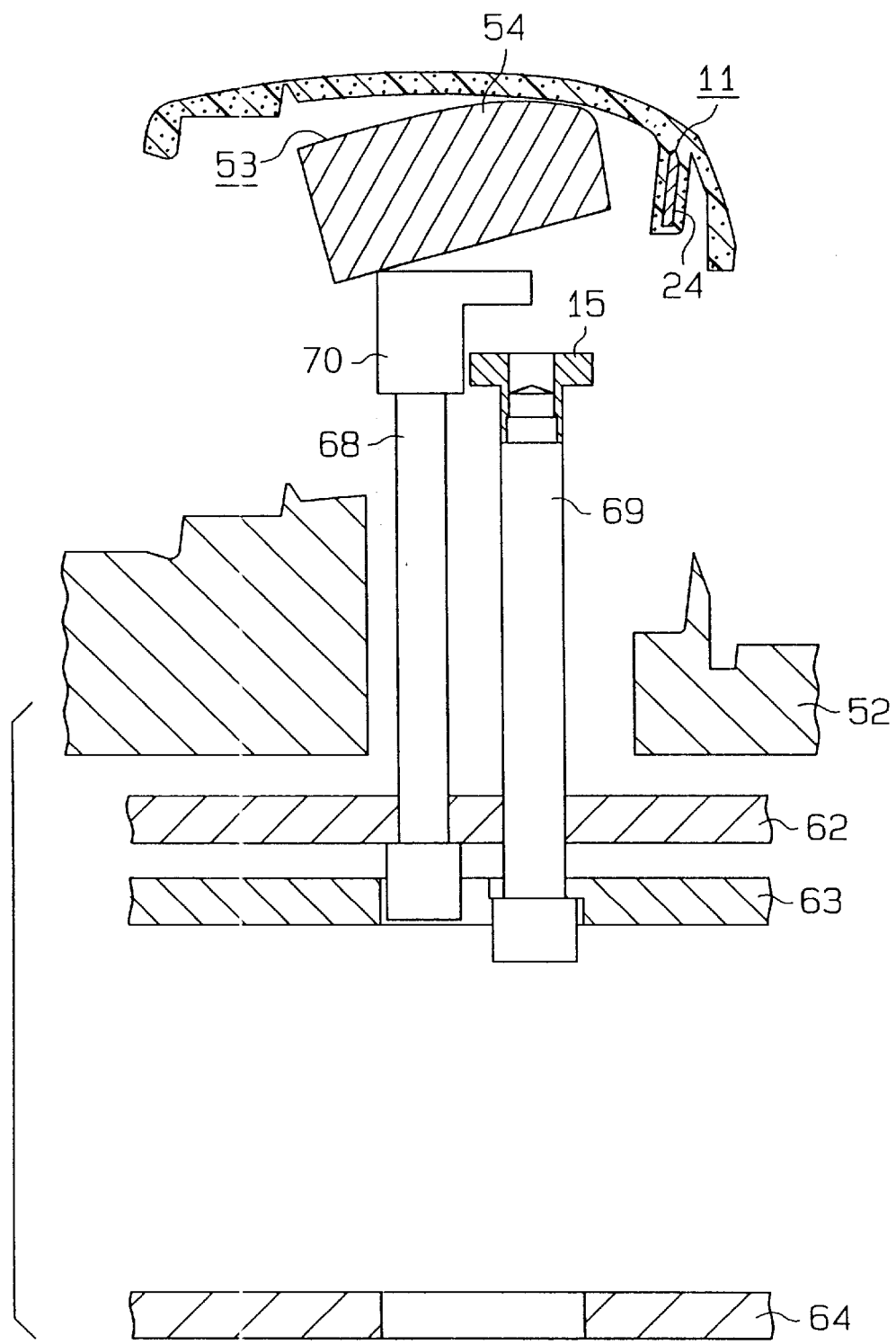
FIG. 21 is a partial cross-sectional view showing the mold and the molded product along a plane that differs from that of the view of FIG. 20.
Figure 22:
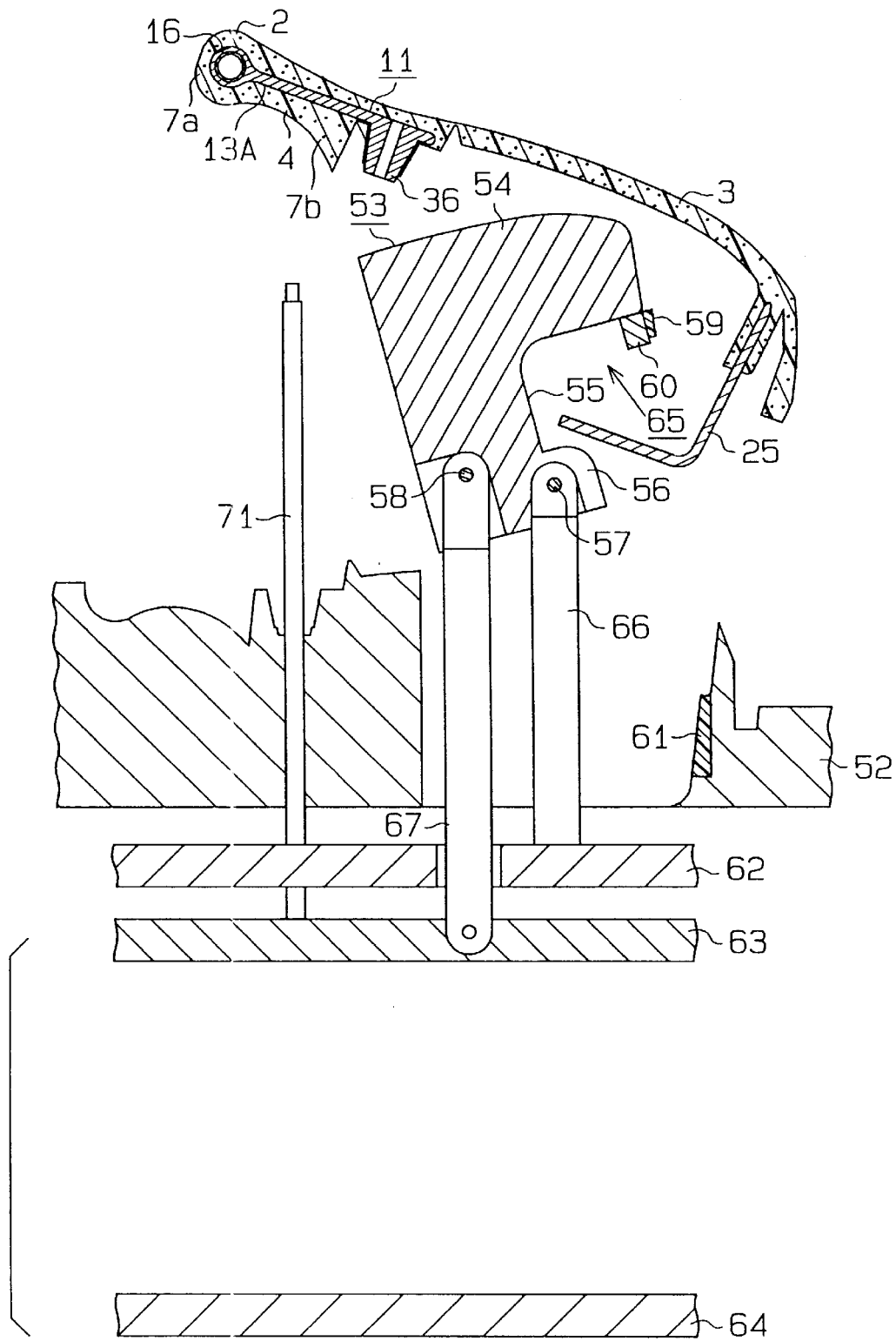
FIG. 22 is a partial cross-sectional view showing the mold and the molded product in the eighth step.

In the seventh step, the second rod plate 63 is further lowered to pivot the float core 53 in a counterclockwise direction as shown in FIGS. 20 and 21. This increases the distance between the seals 59 and the reinforcing bars 25.

In the eighth step, the molded product is inclined to remove the float core 53 from the opening 23 of the metal core 11.

The steering wheel W is molded in the manner described above. The following advantages result from the method and apparatus of the present invention.

The float core 53 provided to mold the pad 3 pivots about an axis perpendicular to the opening direction of the mold. Thus, the molded product (metal core 11) can be separated from the mold by pivoting the float core 53 and removing the float core 53 out of the opening 23 of the metal core 11. This facilitates the removal of the molded product from the mold. In addition, since the pad 3 and the covers 7a, 7b are simultaneously molded, the production cost of the steering wheel W is significantly reduced.

The space 65 provided in the float core 53 enables the float core 53 to pivot smoothly.

The inclination of the boss connectors 21 facilitates removal of burrs that form in the vicinity of the seals 59, 61.

In the preferred embodiment, the float core 53 is pivoted to remove the float core 53 out of the opening 23 of the metal core 11. However, the metal core 11 may be pivoted instead to remove the float core 53 out of the opening 23.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A method for integrally molding a cover and a pad on a steering wheel, wherein the steering wheel includes the cover and a metal core at least partially covered by the cover, the method comprising the steps of:

(a) separating a first mold and a second mold from each other and inclining a floating mold piece between the first and second molds;

(b) arranging the metal core between the first and second molds and inserting the floating mold piece into a space formed in the metal core;

(c) pivoting the floating mold piece to a molding position to engage the floating mold piece with part of the metal core and to position the metal core between the first and second molds;

(d) joining the first and second molds with each other to define a cavity between the first and second molds and the floating mold piece;

(e) charging the cavity with molten resin material to mold the cover with the resin material and to mold the pad integrally with the cover;

(f) separating the first and second molds from each other and releasing the metal core; and (g) inclining the floating mold piece again to allow removal of the metal core and the integral cover and pad from the first and second molds.

2. The method according to claim 1, wherein the first and second molds are movable in a substantially vertical direction.

3. The method according to claim 2, wherein the floating mold piece is pivotal about a substantially horizontal axis to selectively arrange the floating mold piece in the molding position or in an inclined position.

4. A mold apparatus for integrally molding a cover and a pad of a steering wheel, wherein the steering wheel includes a metal core having a wheel core, a boss and a spoke core, said boss located adjacent the center of the metal core and is covered by the molded pad, wherein said spoke core connects the wheel core with the boss, and wherein the metal core is at least partially covered by the cover, the apparatus comprising:

a first mold;

a second mold being relatively movable to the first mold in a first direction, said first and second molds being separable from each other to permit the metal core to be positioned therebetween, said first and second molds being joined with each other after the metal core is placed between the first and second molds to define a first cavity for molding the cover, the first and second molds being again separated from each other to remove the metal core and the cover;

a floating mold piece located between the first and second molds and being pivotably mounted to a pivot mechanism whereby it can pivot about an axis perpendicular to the first direction to facilitate removal of the floating mold piece, the floating mold piece cooperating with the first and second molds to define a second cavity for molding the pad when the first and second molds are joined with each other, the floating mold piece being positioned between the boss and the molded pad after molding is completed; and whereby the metal core covered by the molded cover is easily removed.

5. The apparatus according to claim 4, wherein the pivot mechanism pivots the floating mold piece between a first position for permitting placement of the metal core between the floating mold piece, the first mold, and the second mold, a second position for defining the second cavity, and a third position for permitting the removal of the metal core from between the first and second molds.

6. The apparatus according to claim 4, wherein the first and second molds are movable in a substantially vertical direction, and wherein the axis about which the pivot mechanism pivots the floating mold piece is substantially horizontal.

7. The apparatus according to claim 5, wherein the pivot mechanism includes:

a holder for holding the boss between the first and second molds; and an actuator pivotally connected to the floating mold piece to pivot the floating mold piece and selectively arrange the floating mold piece at the first, second, and third positions.

8. The apparatus according to claim 4, wherein the boss includes a boss plate located near the middle of the metal core, and wherein the holder includes a first holding rod for engaging the boss plate from below and a second holding rod for holding the boss plate engaged with the first holding rod on the first holding rod.

9. The apparatus according to claim 7, wherein the actuator includes:

a pair of spaced connecting pieces projecting from the floating mold piece;

a pin secured to each connecting piece and extending in a direction perpendicular to the moving direction of the first and second molds; and an actuating rod connected to each pin and movable in the first direction, the actuating rods being selectively moved to arrange the float mold piece at the first, second, and third positions.

10. The apparatus according to claim 7, wherein the boss further includes a bore extending in a predetermined direction, and the holder further includes a positioning rod inserted in the bore to position the metal core between the first and second molds.

11. The apparatus according to claim 5, wherein the first mold and the floating mold piece are each provided with a member for clamping part of the metal core when the metal core is located at the second position.

12. The apparatus according to claim 4, wherein the metal core has an opening facing a direction perpendicular to the first direction, wherein the floating mold piece is removed through the opening.

13. A mold apparatus for integrally molding a cover and a pad of a steering wheel, wherein the steering wheel includes a metal core having a wheel core, a boss and a spoke core, wherein the boss is located near the center of the metal core and is overlapped with the molded pad, wherein the spoke core connects the wheel core and the boss, and wherein the metal core is at least partially covered by the cover, the apparatus comprising:

a first mold;

a second mold being vertically and relatively movable to the first mold in a first direction, the first and second molds being separated from each other to arrange the metal core between the first and second molds, the first and second molds being joined with each other after arranging the metal core between said first and second molds to define a first cavity for molding the cover, the first and second molds being again separated from each other to remove the metal core and the cover;

a floating mold piece located between the first and second molds and being pivotably mounted to a pivot mechanism whereby it can pivot about an axis perpendicular to the first direction to facilitate removal of the floating mold piece, the floating mold piece cooperating with the first and second molds to define a second cavity for molding the pad when the first and second molds are joined with each other, the floating mold piece being positioned between the boss and the molded pad after molding is completed; and whereby, following pivoting of the floating mold piece, the metal core covered by the molded cover is easily removed.

14. The apparatus according to claim 13, wherein the pivot mechanism pivots the floating mold piece between a first position for permitting placement of the metal core between the floating mold piece, the first mold, and the second mold, a second position for defining the second cavity, and a third position for permitting the removal of the metal core from between the first and second molds.

15. The apparatus according to claim 14, wherein the pivot mechanism includes:

a holder for holding the boss between the first and second molds; and an actuator pivotally connected to the floating mold piece to pivot the floating mold piece and selectively arrange the floating mold piece at the first, second, and third positions.

16. The apparatus according to claim 15, wherein the boss includes a boss plate located near the middle of the metal core, and wherein the holder includes a first holding rod for engaging the boss plate from below and a second holding rod for holding the boss plate engaged with the first holding rod on the first holding rod.

17. The apparatus according to claim 15, wherein the actuator includes;

a pair of spaced connecting pieces projecting from the float mold piece;

a substantially horizontal pin secured to each connecting piece; and an actuating rod connected to each pin, each actuating rod being movable in a substantially vertical direction, wherein each rod is selectively moved to arrange the floating mold piece at the first, second, and third positions.

18. The apparatus according to claim 15, wherein the boss further includes a bore extending in a substantially vertical direction, and the holder further includes a positioning rod inserted in the bore to position the metal core between the first and second molds.

19. The apparatus according to claim 13, wherein the metal core has an opening facing a direction perpendicular to the first direction, wherein the floating mold piece is removed through the opening.

20. A mold apparatus for integrally molding a cover and a pad of a steering wheel, wherein the steering wheel includes a metal core, wherein the metal core is at least partially covered by the cover, the apparatus comprising:

a first mold;

a second mold being relatively movable to the first mold in a first direction, the first and second molds being separatable from each other to permit the metal core to be positioned therebetween, said first and second molds being joined with each other after the metal core is placed between the first and second molds to define a first cavity for molding the cover, the first and second molds being separable from each other to remove the metal core and the cover;

a floating mold piece located between the first and second molds, the floating mold piece cooperating with the first and second molds to define a second cavity for molding the pad integrally with the cover when the first and second molds are joined with each other; and a pivot mechanism for pivoting the floating mold piece about an axis perpendicular to the first direction to facilitate removal of the integrally molded cover and pad of said steering wheel, wherein said steering wheel contains said metal core, by pivoting the floating mold piece away from said steering wheel.

21. The apparatus according to claim 20, wherein the floating mold piece pivots between an open first position for permitting placement of the metal core between the floating mold piece, the first mold, and the second mold, a closed second position for defining the second cavity, and an open third position for permitting the removal of the steering wheel with metal core and integrally molded cover and pad from between the first and second molds.

22. The apparatus according to claim 20, wherein the first and second molds are movable in a substantially vertical direction, and wherein the axis about which the pivot mechanism pivots the floating mold piece is substantially horizontal.

23. The apparatus according to claim 21, wherein the pivot mechanism includes:

a holder for holding the metal core between the first and second molds; and an actuator pivotally connected to the floating mold piece to pivot the floating mold piece and selectively arrange the floating mold piece at the first, second, and third positions.

24. The apparatus according to claim 23, wherein the metal core includes a boss plate located near the middle of the metal core, and wherein the holder includes a first holding rod for engaging the boss plate from below and a second holding rod for holding the boss plate engaged with the first holding rod on the first holding rod.

25. The apparatus according to claim 23, wherein the actuating means includes:

a pair of spaced connecting pieces projecting from the floating mold piece;

a pin secured to each connecting piece and extending in a direction perpendicular to the moving direction of the first and second molds; and an actuating rod connected to each pin and movable in the first direction, the actuating rods being selectively moved to arrange the floating mold piece at the first, second, and third positions.

26. The apparatus according to claim 23, wherein the metal core further includes a bore extending in a predetermined direction, and the holder further includes a positioning rod inserted in the bore to position the metal core between the first and second molds.

27. The apparatus according to claim 21, wherein the first mold and the floating mold piece are each provided with a member for clamping part of the metal core when the metal core is located at the second position.

28. A mold apparatus for integrally molding a cover and a pad of a steering wheel, wherein the steering wheel includes a metal core, wherein the metal core is at least partially covered by the cover, the apparatus comprising:

a first mold;

a second mold being vertically and relatively movable to the first mold in a first direction, the first and second molds being separated from each other to arrange the metal core between the first and second molds, the first and second molds being joined with each other after arranging the metal core between said first and second molds to define a first cavity for molding the cover, the first and second molds being again separated from each other to remove the metal core and the cover;

a floating mold piece located between the first and second molds, the floating mold piece cooperating with the first and second molds to define a second cavity for molding the pad when the first and second molds are joined with each other, the floating mold piece positioned under the molded pad after molding is completed; and a pivot mechanism for pivoting the floating mold piece about a horizontal axis to facilitate removal of the steering wheel having a metal core and an integrally molded pad and cover.

29. The apparatus according to claim 28, wherein the floating mold piece pivots between a first position for permitting placement of the metal core between the floating mold piece, the first mold, and the second mold, a second position for defining the second cavity, and a third position for permitting the removal of the metal core from between the first and second molds.

30. The apparatus according to claim 29, wherein the pivot mechanism includes:

a holder for holding the metal core between the first and second molds; and an actuator pivotally connected to the floating mold piece to pivot the floating mold piece and selectively arrange the floating mold piece at the first, second, and third positions.

31. The apparatus according to claim 30, wherein the metal core includes a boss plate located near the middle of the metal core, and wherein the holder includes a first holding rod for engaging the boss plate from below and a second holding rod for holding the boss plate engaged with the first holding rod on the first holding rod.

32. The apparatus according to claim 30, wherein the actuator includes;

a pair of spaced connecting pieces projecting from the floating mold piece;

a substantially horizontal pin secured to each connecting piece; and an actuating rod connected to each pin, each actuating rod being movable in a substantially vertical direction, wherein each rod is selectively moved to arrange the floating mold piece at the first, second, and third positions.

33. The apparatus according to claim 30, wherein the metal core further includes a bore extending in a substantially vertical direction, and the holder further includes a positioning rod inserted in the bore to position the metal core between the first and second molds.

* * * * *